United States Patent
Kwon et al.

(10) Patent No.: US 8,873,658 B2
(45) Date of Patent: *Oct. 28, 2014

(54) APPARATUS AND METHOD FOR TRANSMITTING DATA USING A PLURALITY OF CARRIERS

(71) Applicant: LG Electronics Inc., Seoul (KR)

(72) Inventors: Yeong Hyeon Kwon, Suwon-si (KR); Seung Hee Han, Seoul (KR); Min Seok Noh, Seoul (KR); Young Woo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,204

(22) Filed: Dec. 21, 2012

(65) Prior Publication Data

US 2013/0177093 A1 Jul. 11, 2013

Related U.S. Application Data

(63) Continuation of application No. 13/278,135, filed on Oct. 20, 2011, now Pat. No. 8,340,203, which is a continuation of application No. 12/096,565, filed as application No. PCT/KR2006/005234 on Dec. 6, 2006, now Pat. No. 8,059,738.

(30) Foreign Application Priority Data

Dec. 6, 2005 (KR) .......... 10-2005-0118200
Dec. 16, 2005 (KR) .......... 10-2005-0124709

(51) Int. Cl.
*H04L 5/12* (2006.01)
*H04L 27/26* (2006.01)
*H04L 27/34* (2006.01)

(52) U.S. Cl.
CPC .......... *H04L 27/262* (2013.01); *H04L 27/2621* (2013.01); *H04L 27/3488* (2013.01); *H04L 27/3483* (2013.01)

USPC .......... 375/261; 375/260; 375/279; 375/297; 375/299; 375/267; 375/300

(58) Field of Classification Search
USPC .................. 375/261, 260, 279, 297, 299, 300
See application file for complete search history.

(56) References Cited

U.S. PATENT DOCUMENTS 6,621,872 B1 9/2003 Jones et al.
6,973,118 B1 12/2005 Ikeda et al.
(Continued)

FOREIGN PATENT DOCUMENTS

EP 1139625 10/2001
EP 1381196 1/2004
(Continued)

OTHER PUBLICATIONS

Jones D.L.; "Peak Power Reduction in OFDM and DMT via active channel modification;" Conference Record of the 33rd Asilomar Conference on Signals, Systems and Computers; Oct. 24, 1999; Piscataway, N.J., 5 pages.

(Continued)

*Primary Examiner* — Kabir A Timory
(74) *Attorney, Agent, or Firm* — Lee, Hong, Degerman, Kang & Waimey

(57) ABSTRACT

An apparatus for receiving signals includes a receiver for receiving a time domain signal from a transmitter, wherein at least one first information bit is mapped, resulting in at least one first mapped symbol; at least one second information bit is mapped, resulting in at least one second mapped symbol; the at least one second mapped symbol is multiplied by at least one third information bit; and the time domain signal is generated from the at least one first mapped symbol and the at least one second mapped symbol.

14 Claims, 25 Drawing Sheets

(56) References Cited

U.S. PATENT DOCUMENTS

| | | |
|---|---|---|
| 7,706,455 B2 | 4/2010 | Davydov et al. |
| 2002/0163880 A1 | 11/2002 | Matsumoto |
| 2006/0045001 A1 | 3/2006 | Jalali |
| 2006/0256839 A1 | 11/2006 | Tsai et al. |
| 2009/0220019 A1 | 9/2009 | Kwon et al. |
| 2012/0093248 A1 | 4/2012 | Kwon et al. |

FOREIGN PATENT DOCUMENTS

| | | |
|---|---|---|
| GB | 2412826 | 10/2005 |
| KR | 1020030084291 | 11/2003 |
| KR | 1020040029013 | 4/2004 |
| WO | 00/51275 | 8/2000 |
| WO | 2005020529 | 3/2005 |

OTHER PUBLICATIONS

Taiwan Intellectual Property Office Application Serial No. 095145543, Office Action dated May 3, 2013, 5 pages.

Cimini, et al., "Peak-to-Average Power Ratio Reduction of an OFDM Signal Using Partial Transmit Sequences With Embedded Side Information," 2000 IEEE Global Telecommunications Conference, XP-001017186, Nov. 2000, pp. 746-750.

European Patent Office Application Serial No. 06823941.7, Search Report dated Feb. 24, 2014, 10 pages.

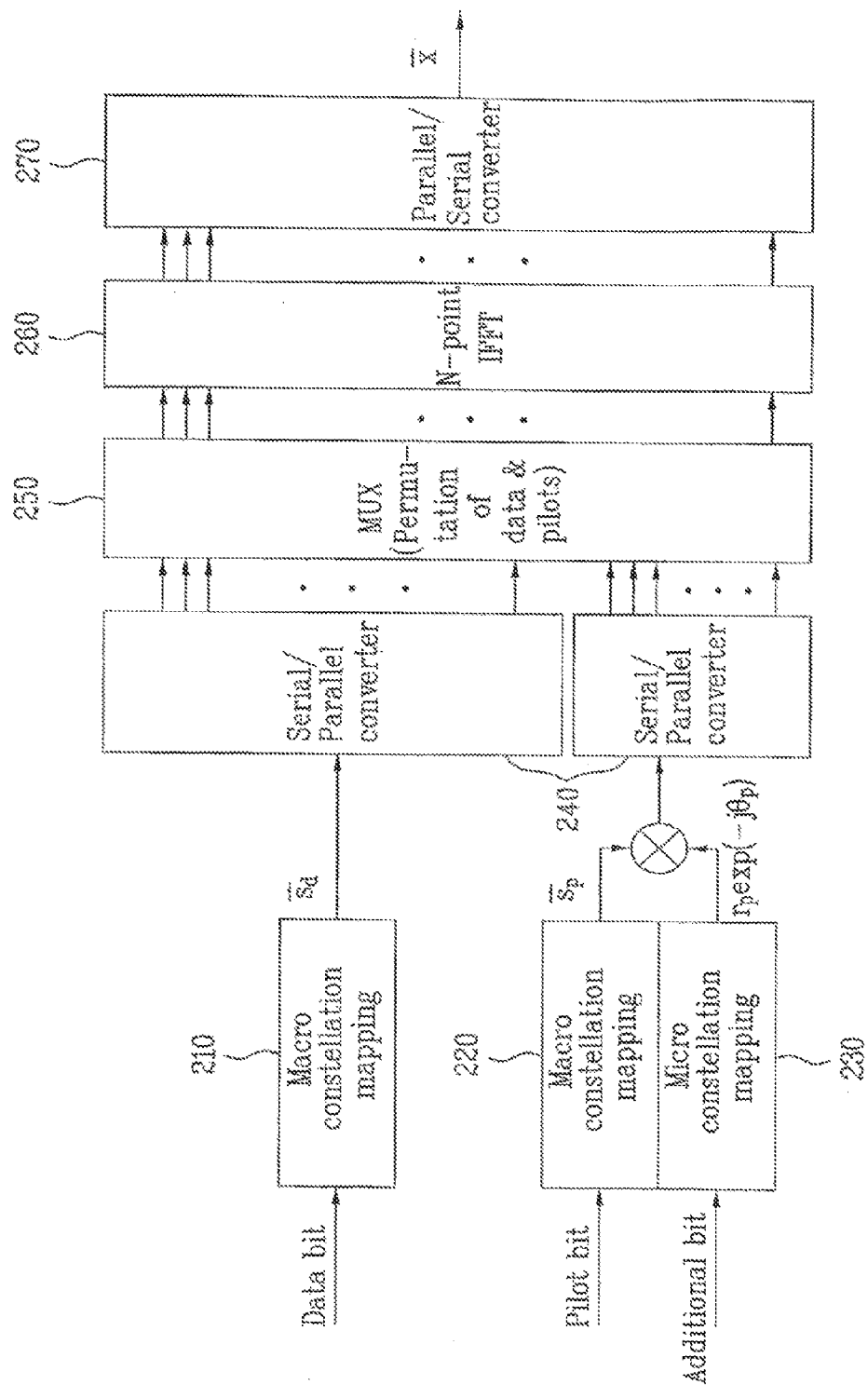

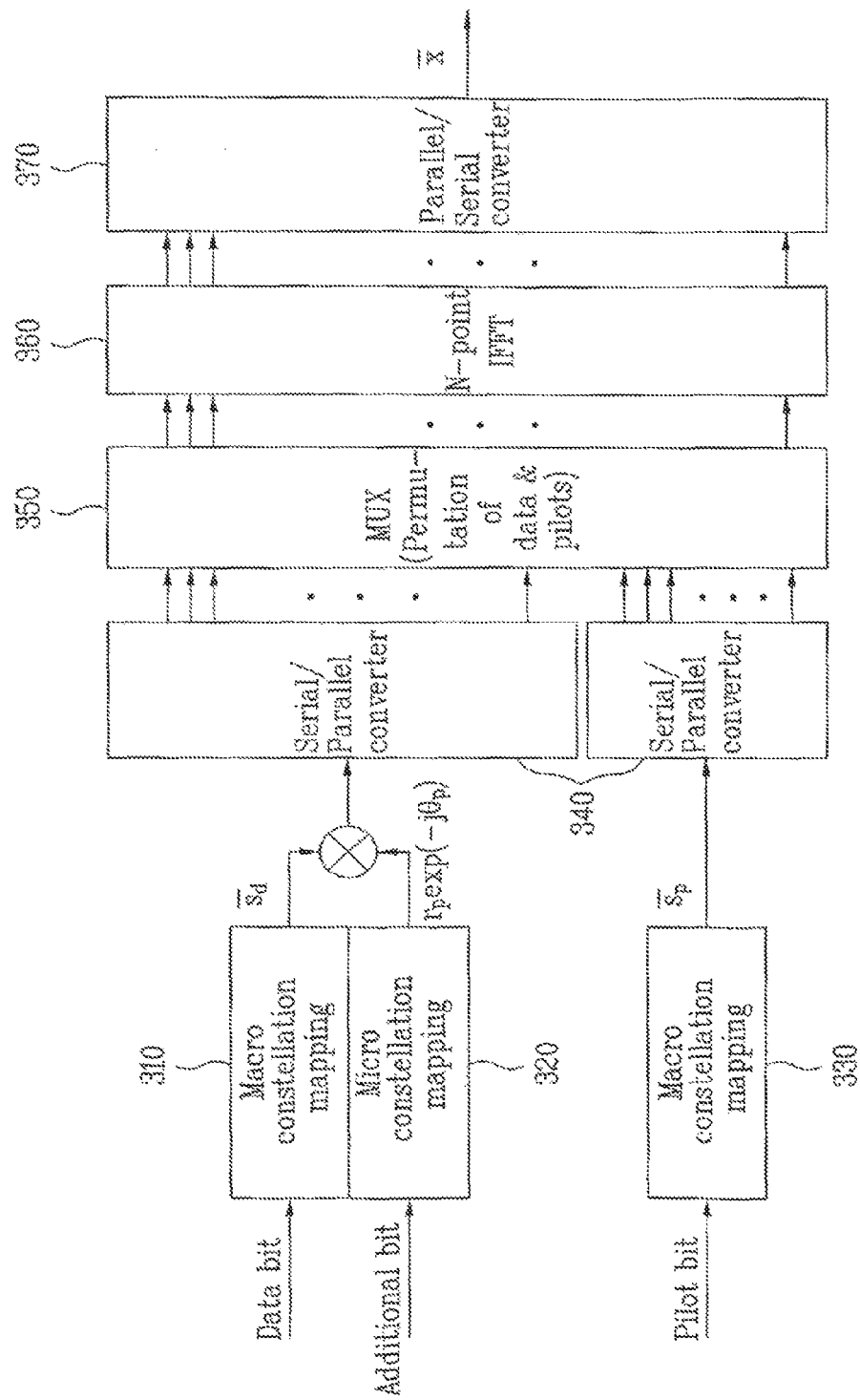

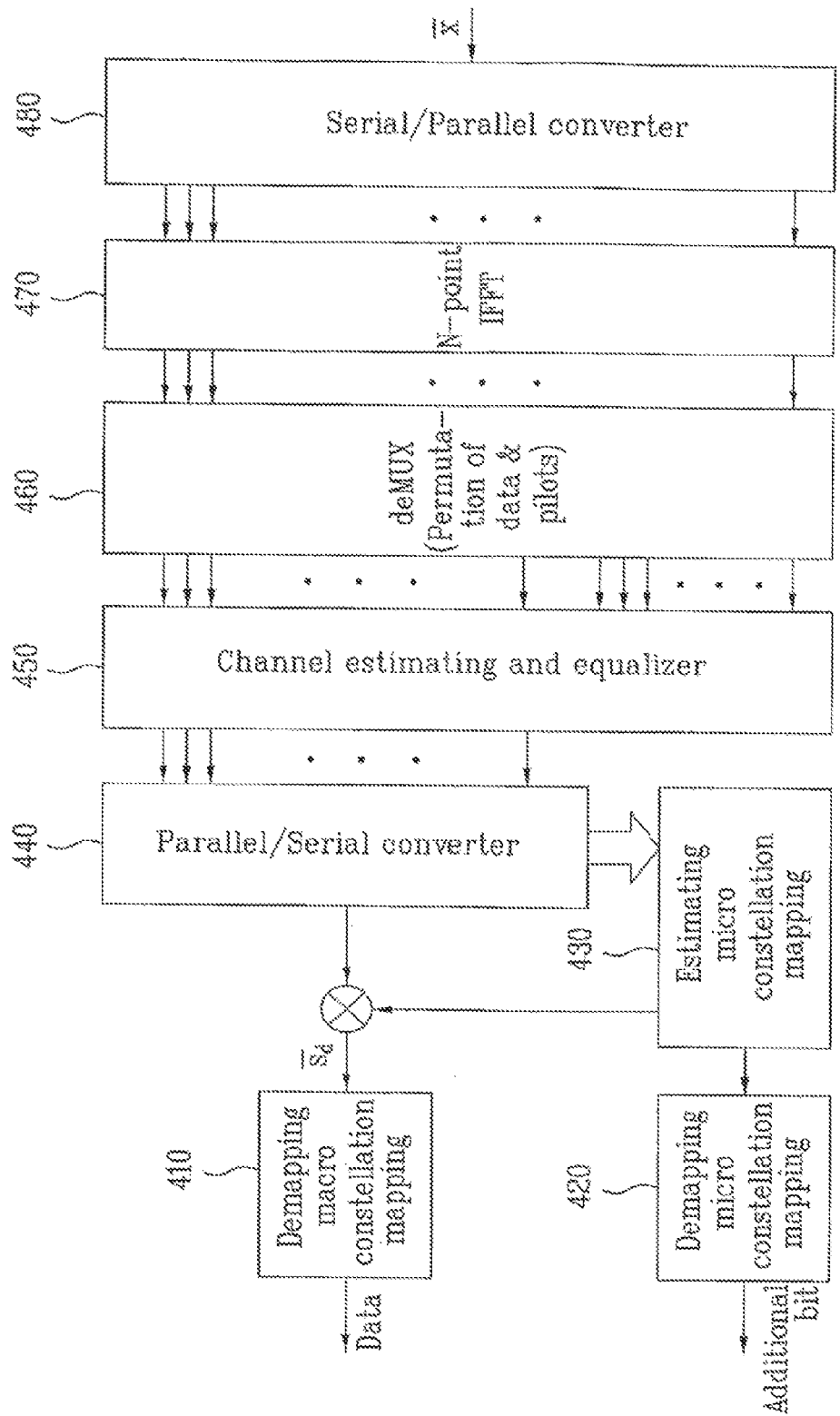

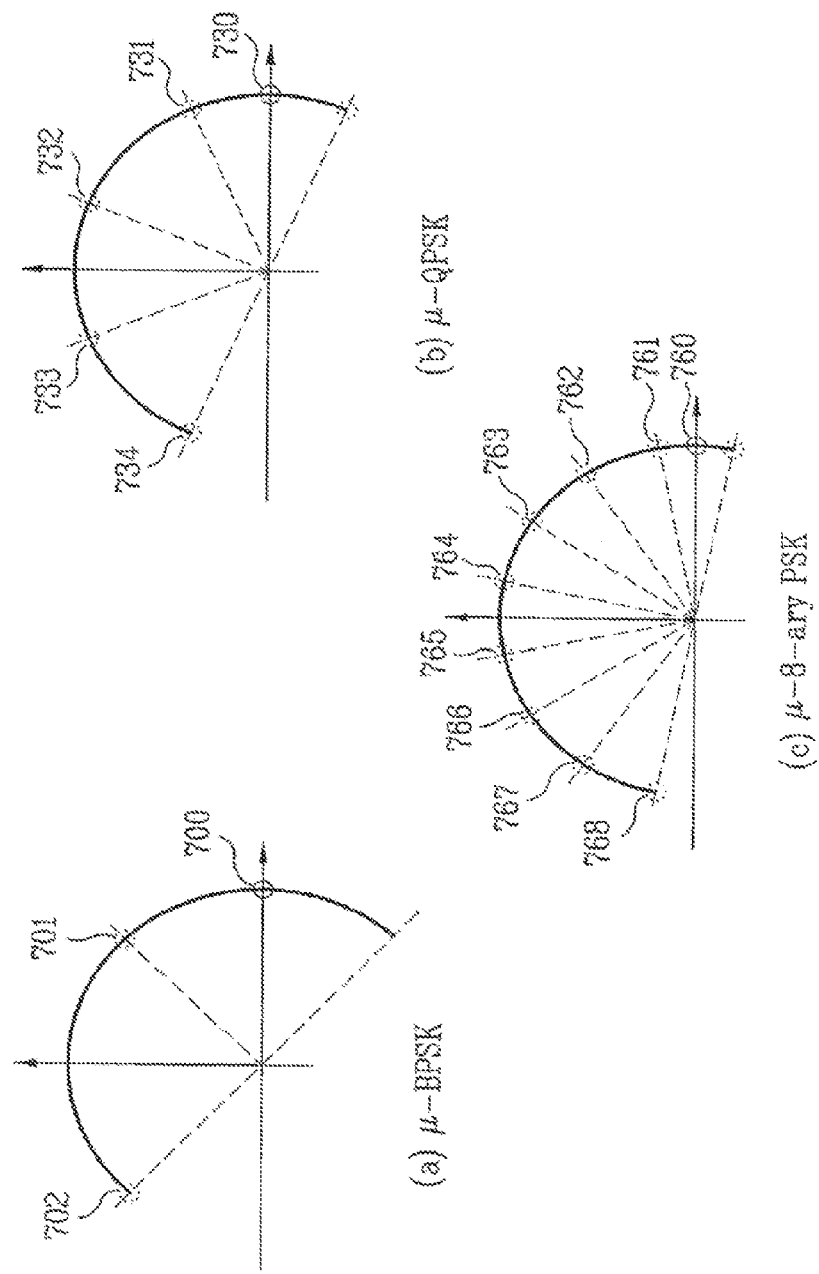

APPARATUS AND METHOD FOR TRANSMITTING DATA USING A PLURALITY OF CARRIERS

CROSS-REFERENCE TO RELATED APPLICATIONS

This application is a continuation of U.S. patent application Ser. No. 13/278,135, filed on Oct. 20, 2011, now U.S. Pat. No. 8,340,203, which is a continuation of U.S. patent application Ser. No. 12/096,565, filed on Oct. 6, 2008, now U.S. Pat. No. 8,059,738, which is the National Stage filing under 35 U.S.C. 371 of International Application No. PCT/KR2006/005234, filed on Dec. 6, 2006, which claims the benefit of earlier filing date and right of priority to Korean Patent Application Nos. 10-2005-0118200, filed on Dec. 6, 2005, and 10-2005-0124709, filed on Dec. 16, 2005, the contents of which are all hereby incorporated by reference herein in their entirety.

TECHNICAL FIELD

The invention relates to a method of transmitting and receiving data in a communication system, and more particularly, to a data transmitting and receiving method of transmitting supplementary data in a communication system based on an orthogonal frequency division multiplexing (hereinafter, referred to 'OFDM').

BACKGROUND ART

Recently, demand for high-speed data transfer is increasing, and the OFDM suits with this high-speed data transfer and is employed in various high-speed communication systems. Hereinafter, the OFDM will be described. A basic principle of the OFDM is that a data stream having a high-rate is divided into a plurality of data streams having a slow-rate that are transmitted by a plurality of carriers simultaneously. Each of the plural carriers is called a sub-carrier. Since there is orthogonality between the plural carriers of the OFDM, a frequency component of the carrier can be detected at a receiving end even when the carriers are overlapped with each other. The data stream having a high-rate is transmitted to the receiving end by which the data stream is converted into a plurality of data streams having a low-rate by a serial-to-parallel converter, the sub-carriers are multiplied to the parallel converted plural data stream, and the multiplied converted data streams are combined with each other.

An orthogonal frequency division multiple access (OFDMA) is a multiple access method of allocating the sub-carriers to entire broadband in the OFDM according to transfer rate demanded by multiple users.

There is proposed a single carrier frequency division multiple access (SC-FDMA) technique of adding a spreading technique by a discrete Fourier transform (DFT) spreading matrix to the OFDM technique. The SC-FDMA technique has a low Peak-To-Average Power Ratio (PAPR).

The OFDM communication technique is a communication method used in various systems such as IEEE 802.11a/g, HiperLAN, IEEE 802.16, Digital Subscriber Line (DSL), Digital Audio Broadcasting (DAB), Digital Video Broadcasting (DVB), and the like and is effective when a communication channel appears as a selective-fading phenomenon. The OFDM communication method uses several sub-carriers so that the selective-fading looks like a flat fading and has a merit that a technique of compensating the fading is simplified in overall system. In order to easily estimate the simplified channel, pilot sub-carrier information is used. Since a position and a value of the pilot sub-carrier are already known to a transmitting end and a receiving end, the receiving end can obtain the position and value of the pilot sub-carrier simply by carrying out division (or equivalent operation) in order to estimate the channel.

For the synchronization, a phase difference between different OFDM symbols is determined, and this is obtained by comparing a phase of a pilot signal with the different OFDM signals.

This pilot may be used in various purposes other than the above-mentioned two purposes, for example, in an encoded pilot or in a technique of reducing the PAPR.

FIG. 1A illustrates a conventional transmitting end to transmit an OFDM signal. As illustrated in the drawing, data bits are mapped into specific data symbols according to constellation mapping, and pilot bits are mapped into specific pilot symbols according to constellation mapping. The data symbol is mapped into sub-carriers after being converted into a parallel signal (a transfer symbol to be transmitted to the receiving end) through the serial-to-parallel conversion. The data symbol is transmitted to the receiving end after carrying out an inversion fast Fourier transform (IFFT). The data bits represent a bit stream indicating user data except for the pilot sub-carrier.

The operation is expressed by the formulas as follows.

In the conventional OFDM transfer technique, when N sub-carriers are used, $N_p$ pilot sub-carriers among the N sub-carriers are allocated and the rest is allocated to data or a guard band. Hereinafter, for the illustrative convenience, the data (the user data and the pilot data) except for the guard band will be described. When the number of the sub-carriers allocated to the data is $N_d$, a relationship $N=N_p+N_d$ is established. A vector of the transfer symbol in which the user data is combined with the pilot signal, $\vec{S} = [S_0, S_1, \Lambda, S_{N-1}]^T$ is expressed by the following formula.

$$\vec{S} = P_d \vec{S}_d + P_p \vec{S}_p \quad \text{[Formula 1]}$$

where, Pd and Pp are matrixes of re-arranging the user data and the pilot sub-carriers at positions of the already allocated sub-carriers, and the $\vec{S}_d$ and $\vec{S}_p$ are the symbol vectors transmitted by the user data and the pilot sub-carriers respectively and the lengths thereof are $N_d$ and $N_p$ respectively. The transfer symbol vector $\vec{S}$ in the frequency region meets with the IFFT like in the following formula.

$$\vec{x} = [x_0, x_1, \Lambda, x_{N-1}]^T = F^{-1} \vec{S} \quad \text{[Formula 2]}$$

where, F is a Fourier transform matrix. The vector $\vec{x}$ is modulated into a carrier frequency to be transmitted through an antenna again, and the receiving end receives a signal such as $\vec{r} = \vec{h} \otimes \vec{x} + \vec{w}$. Here, $\vec{h}$ is a response vector of a wired/wireless channel and $\vec{w}$ corresponds to a noise. The receiving end firstly carries out the Fourier transform in order to demodulate the vector $\vec{r}$ representing the receiving signal. Then, the following formula 3 is expressed.

$$\vec{R} = F\vec{r} = H\vec{d} + F\vec{w} \quad \text{[Formula 3a]}$$

where, H represents a channel response within the frequency region and $\vec{S}$ represents original data. If the channel has been estimated, the transfer signal is demodulated by the following formula according to the estimated channel value.

$$\hat{d} = (H^H H)^{-1} H^H \hat{y}$$ [Formula 3b]

where, $\hat{d}$ is an estimated value of $\hat{s}$. A conventional method of transmitting the OFDM signals is identical to the above-mentioned transfer method or is carried out by processes corresponding to the same.

Hereinafter, the PAPR causing a problem in the OFDM communication system will be described.

In the OFDM communication system, there occurs a problem such that a linear span of a power amplifier of an transmitting end must be wider as the PAPR is high. In general, since a power amplifier having a large linear span is expensive, in order to reduce manufacturing costs of mobile terminals, a cheap power amplifier is used in wired/wireless communication so that an output range is narrow and due to this, the OFDM signal is distorted.

Various methods have been proposed in order to solve the problems about the PAPR, and are grouped into two parts. A first method is to transmit additional information for PAPR identification (for example, a selective mapping, a partial transmit sequence, and the like), and transmit the additional information for PAPR identification through an additional channel by forming the additional channel in a way of using some of the sub-carriers. A second method does not need the additional information for PAPR identification (for example, a tone reservation), and in this case, the user consumes more electric power and a receiving end undergoes more interference.

FIG. 1B is a view illustrating a conventional transmitting end to reduce the PAPR using the additional information for PAPR identification.

In the conventional transmitting end illustrated in FIG. 1B, the OFDM signal is transmitted according to the formulas 1 and 2.

A PAPR reducing technique has a target of minimizing a difference between an average value and a maximal value of power of $\hat{x}$ in Formula 2. The PAPR is defined by the following formula.

$$PAPR = \frac{\max_{k=0,\wedge,N-1} |x_k|^2}{\frac{1}{N}\sum_{k=0}^{N-1} |x_k|^2}$$ [Formula 4a]

As shown in the above formula, when any one of the vector components has an abnormally large value, the PAPR is increased and the characteristic of the signal is deteriorated. To solve this problem, a method used in the frequency region can be expressed by the following formula.

$$\hat{u} = M_S M_P \hat{y}$$ [Formula 4b]

where, Ms is a matrix of varying a phase component of the respective data components of $\hat{y}$, and $M_p$ is a matrix of changing order of the data components. This new modified data vector $\hat{u}$ is transformed into a signal in a time domain through a transform such as the formula 2 and the PAPR of a signal transformed into the time domain.

Since there are several $M_s$ and $M_p$, signals are made in a time domain and the smallest PAPR is selected from the signals and is transmitted. At that time, the additional information about the $M_s$ and $M_p$ must be transmitted and this information is called the additional information for PAPR identification.

The additional information for PAPR identification can be transmitted by generating additional channel in a code division multiple access (CDMA) communication system. The OFDM communication system adopts a method of being allocated with some of the sub-carriers to transmit the additional information for PAPR identification.

The conventional methods of transmitting the additional information for PAPR identification must use the additional channel for the transmission of the additional information for PAPR identification.

If some of the sub-carriers of the OFDM communication system are used as the additional channels, the communication system may be deteriorated.

Moreover, in the conventional methods of not transmitting the additional information for PAPR identification, the transmitting end's total power is increased and interferes with other receiving ends.

DISCLOSURE OF INVENTION

Therefore, the present invention has been made in view of the above problems, and it is an aspect of the present invention to provide an orthogonal frequency division multiplexing signal transmitting and receiving method of generating a new channel for data communication.

It is another aspect of the present invention to provide an information transmitting and receiving method of reducing a peak-to-average ratio (PAPR) through a new generated channel for data communication.

In accordance with an aspect of the present invention, the above and other objects can be accomplished by the provision of a method of transmitting an orthogonal frequency division multiplexing signal comprising: mapping an input bit stream into at least one transfer symbol; changing at least one of amplitudes and phases of the transfer symbols that are transmitted by a specific sub-carrier group having a plurality of sub-carriers using constellation modification information to indicate specific additional data; and transmitting the transfer symbols, to which the changing is carried out, to a receiving end by an orthogonal frequency division multiplexing data processing, the constellation modification information being identical to each other with respect to the transfer symbols that are transmitted by the specific sub-carrier group.

In accordance with an aspect of the present invention, the above and other objects can be accomplished by the provision of an orthogonal frequency division multiplexing signal transmitting apparatus to transmit a data symbol to a receiving end using a plurality of sub-carriers, the transmitting apparatus comprising: a first mapping module to map an input bit stream into at least one transfer symbol; and a second mapping module to change at least one of amplitudes and phases of the transfer symbols that are transmitted by a specific sub-carrier group having a plurality of sub-carriers, using constellation modification information to indicate specific additional data by changing the at least one of the amplitudes and the phases of the transfer symbols that are transmitted by the specific sub-carrier group using constellation modification information identical to each other.

In accordance with an aspect of the present invention, the above and other objects can be accomplished by the provision of a method of receiving an orthogonal frequency division multiplexing signal transmitted by a plurality of sub-carriers, comprising: estimating at least one of amplitudes and phases of receiving symbols received by the plurality of sub-carriers by estimating at least one of modified amplitudes and phases from previously determined amplitudes and phases; acquiring additional data to indicate at least one of the estimated amplitudes and phases; recovering the amplitudes and phases of the receiving symbols using at least one of the estimated amplitudes and phases; and acquiring data contained in the recovered receiving symbols.

In accordance with an aspect of the present invention, the above and other objects can be accomplished by the provision of a receiving end to receive an orthogonal frequency division multiplexing signal transmitted by a plurality of sub-carriers, comprising: a first demodulating module to estimate at least one of amplitudes and phases of receiving symbols received by the plurality of sub-carriers by estimating at least one of modified amplitudes and phases from previously determined amplitudes and phases, and to acquire additional data to indicate at least one of the estimated amplitudes and phases; and a second demodulating module to recover the amplitudes and phases of the receiving symbols using at least one of the estimated amplitudes and phases, and to acquire data contained in the recovered receiving symbols.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a view illustrating an example of a transmitting end of transmitting additional data, contained in a pilot signal, according to an embodiment of the present invention;

FIG. 3 is a view illustrating an example of a transmitting end of transmitting additional data, contained in a data signal, according to an embodiment of the present invention;

FIG. 4 is a view illustrating a receiving end of receiving a receiving signal, containing additional data signal, according to an embodiment of the present invention;

FIG. 7 is a view illustrating a result that the micro constellation coordinate is generated when the macro constellation mapping is the BPSK;

BEST MODE FOR CARRYING OUT THE INVENTION

Figure 1A:
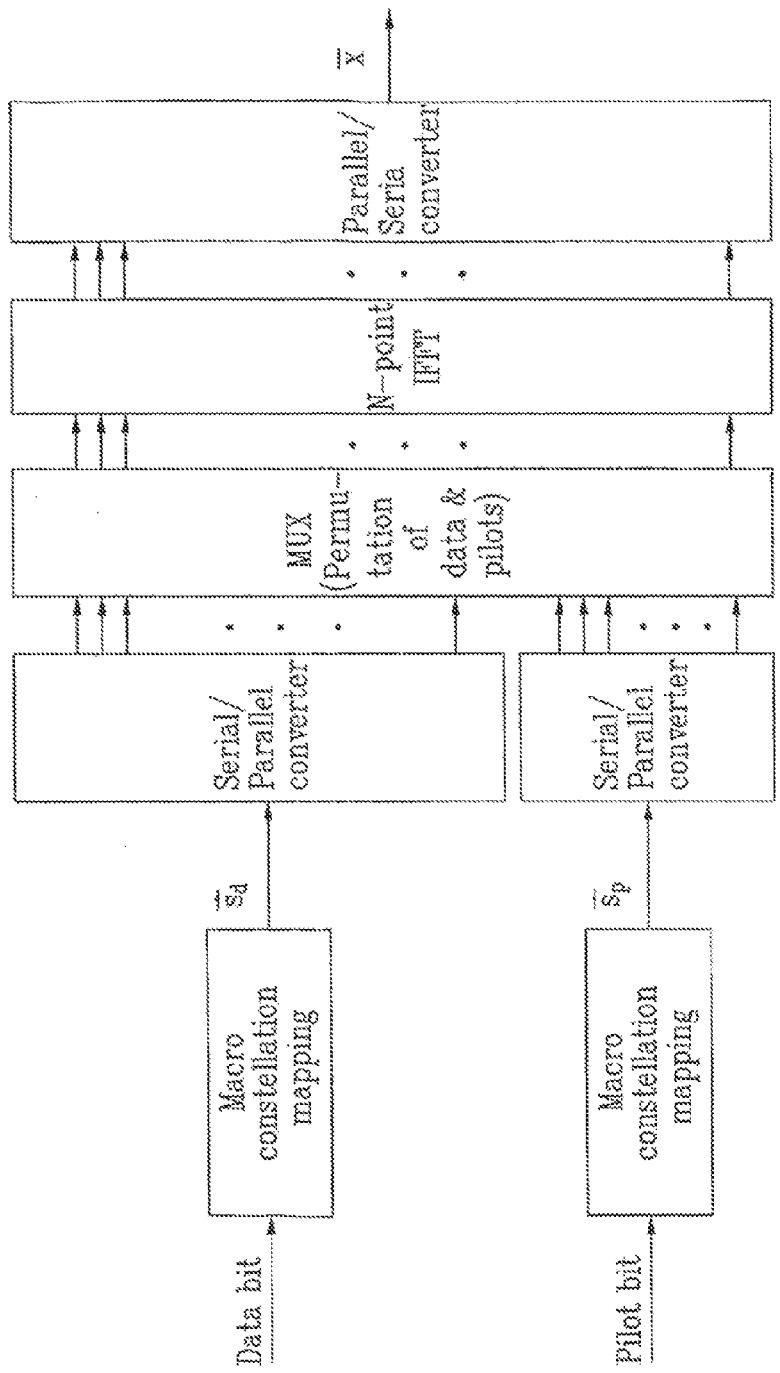
FIG. 1A illustrates a conventional transmitting end to transmit an orthogonal frequency division multiplexing (OFDM) signal.
Figure 1B:
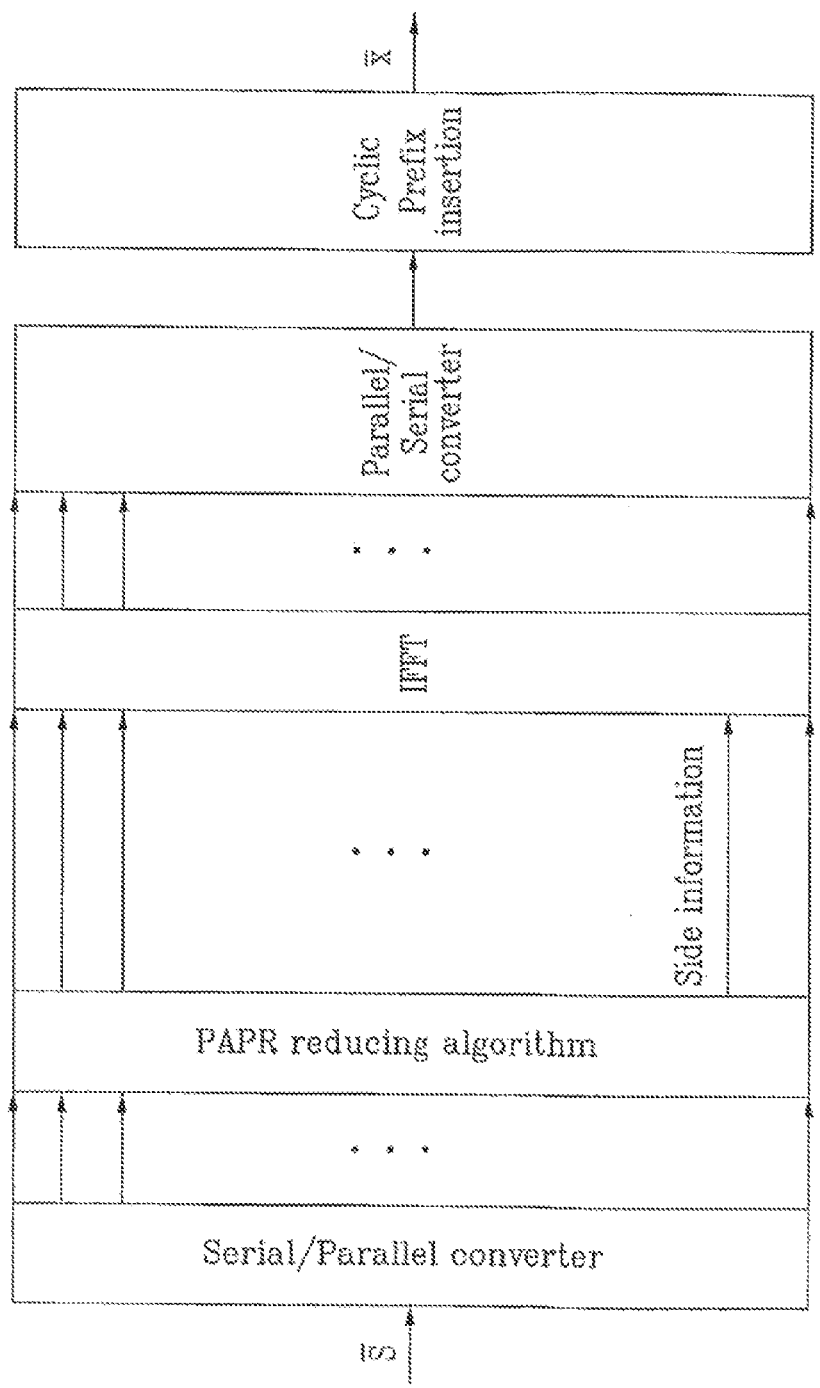
FIG. 1B is a view illustrating a conventional transmitting end to reduce a peak-to-average power ratio (PAPR) using additional information for PAPR identification.

Reference will now be made in detail to the embodiments of the present invention, examples of which are illustrated in the accompanying drawings.

The present invention proposes a method of containing additional data generated by a micro constellation mapping into a pilot signal or a user data signal that is transmitted by specific sub-carriers.

The micro constellation mapping method is distinguished from a constellation mapping method applied to the pilot signal or the data signal that is contained in an orthogonal frequency division multiplexing (OFDM) symbol, and a additional channel can be generated by carrying out the micro constellation mapping in the present invention. In the present invention, the additional data is transmitted by the micro constellation mapping so that it is not necessary to notify control information for the recovery of the additional data to a receiving end.

Structure, operation, and effect of the present invention will be described in detail through the following embodiments of the present invention.

A first embodiment of the present invention relates to a method of forming a new data channel in a conventional OFDM communication system (for example, the OFDM communication system, the orthogonal frequency division multiple access (OFDMA) communication system, and a single carrier frequency division multiple access (SC-FDMA) communication system).

Through the new data channel, a variety of additional information can be transmitted and received. In a second embodiment of the present invention, a method of transmitting information for a peak-to-average power ratio (PAPR) utilizing the first embodiment of the present invention will be proposed. In other words, the micro constellation mapping (or, a phase shift) is carried out according to the first embodiment of the present invention, and information for the PAPR is transmitted and received by carrying out the micro constellation mapping.

Hereinafter, the first embodiment of the present invention will be described.

Embodiment 1

In the first embodiment of the present invention, data is transmitted by overwriting a separate constellation signal for additional data onto a group of sub-carriers in the OFDM communication system, and an additional control signal that a receiving end uses to correctly recover the overwritten constellation signal is not transmitted.

The first embodiment of the present invention provides roughly two methods, such as a method of transmitting and receiving additional data by containing the additional data in the user data signal included in an OFDM symbol, and a method of transmitting and receiving additional data by containing the additional data in the pilot signal included in an OFDM symbol.

Moreover, the transmitting and receiving method of containing the additional data in the user data signal is divided into a method of transmitting and receiving the additional data by containing the identical additional data in all user data signals contained in a single OFDM symbol and a method of transmitting and receiving the additional data by containing different additional data in respective groups in which data signals, included in a single OFDM symbol, are grouped.

FIG. 2 is a view illustrating an example of a transmitting end of transmitting the additional data, contained in the pilot signal, according to the first embodiment of the present invention. Moreover, FIG. 3 is a view illustrating an example of a transmitting end of transmitting the additional data, contained in the data signal, according to the first embodiment of the present invention. Hereinafter, the method of transmitting data according to the first embodiment of the present invention will be described with reference to FIGS. 2 and 3.

The transmitting end in FIG. 2 includes a macro constellation mapping module 210 to carry out a constellation mapping of user data bits, a macro constellation mapping module 220 to carry out a constellation mapping of pilot bits, a micro constellation mapping module 230 to carry out a constellation mapping of additional data bits that are transmitted together with the pilot bit, a serial-to-parallel (S/P) converter 240 to convert transfer symbols into parallel signals, a multiplexer (MUX) 250 to allocate the parallel signals to the sub-carriers, an N point inversion fast Fourier transform (IFFT) module 260 to perform a IFFT operation, and a parallel-to-serial (P/S) converter 270 to convert the parallel signals into serial signals to transmit the converted serial signals to a radio frequency (RF) module of the transmitting end.

The transmitting end in FIG. 3 includes a macro constellation mapping module 310 to carry out a constellation mapping of user data bits, a macro constellation mapping module 320 to carry out a constellation mapping of additional data bits that are transmitted together with the user data, a macro constellation mapping module 330 to carry out a constellation mapping of pilot bits, a S/P converter 340 to convert transfer symbols into parallel signals, a MUX 350 to allocate the parallel signals to the sub-carriers according to a predetermined rule, an N point IFFT module 360 to perform a IFFT operation and a P/S converter 370 to convert the parallel signals into serial signals to transmit the converted serial signal to an RF end of the transmitting end.

The user data bits mean bits representing the user data signal to be transmitted in the OFDM system, the pilot bits mean bits representing the pilot signals, already known to a transmitting end and a receiving end, and the additional data bits mean the additional data signals to be additionally transmitted in the present invention. The macro constellation mapping means a constellation mapping method with respect to the user data signals and the pilot signals except for the additional data signals. Thus, the macro constellation mapping is enabled by a binary phase shift keying (BPSK), a quadrature phase shift keying (QPSK), an M-ary phase shift keying (PSK), an M-ary quadrature amplitude modulation (QAM), and the like, and there is no limit of the methods. The micro constellation mapping means a separate constellation mapping method for the additional data signals.

As described above, in this embodiment of the present invention, since the additional data signals are contained in the pilot signal to be transmitted by various methods, hereinafter, a method of transmitting the additional data signals by containing the additional data signals in the pilot signals will be described.

$$\tilde{P} = P_d \tilde{P} + r_p \exp(-j\theta_p) P_p \tilde{P} \qquad \text{[Formula 5]}$$

where, $r_p$ and $\theta_p$ are values that are commonly contained in the pilot signals and represent an amplitude and a phase, respectively. In other words, the $r_p \exp(-j\theta_p)$ represents the additional data symbol that the additional data bits are converted by the micro constellation mapping. A signals of the Formula 5 is converted into the time domain signal by carrying out the Formula 2 and may be transmitted to the receiving end.

Signals in which the additional data signals, the pilot signals, and the user data signals are contained are transmitted by a plurality of sub-carriers.

According to this embodiment of the present invention, since the transfer symbol, to which at least two constellation mapping methods are applied, is preferably transmitted by a plurality of sub-carriers being orthogonal to each other as described above, the transfer symbol can be transmitted by various methods.

Hereinafter, for the illustrative convenience, a series of procedures of mapping the data symbol, to which the constellation mapping is carried out, to specific sub-carriers and of transmitting the mapped data symbol to the receiving end is called an OFDM transmitting data process. Since the OFDM transmitting data process includes a data processing operation carried out in processing blocks following the S/P converter 240, it is obvious to those skilled in the art that the OFDM transmitting data processing operation may use another communication device for the improvement of the transmission quality.

Hereinafter, a method of commonly containing the additional data signals in the user data signals to be transmitted according to the embodiment of the present invention will be described.

$$\overset{\rho}{S} = r_p \exp(-j\theta_p) P_d \overset{\rho}{S} + P_p \overset{\rho}{S} \quad \text{[Formula 6]}$$

where, $r_p$ and $\theta_p$ are values commonly contained in the pilot signals, and represent an amplitude and a phase, respectively.

When the additional data signals are contained in the user data signals as expressed by the formula 6, there are advantages as follows. In a case of the pilot signals, there is a limit for the number of the pilot signals, and the pilot signals are used in the equalization and the channel estimation of the receiving end. In a case of using the formula 5 to contain the additional data signals in the pilot signals, the equalization or the channel estimation may be difficult. Thus, when the additional data signals are contained to the user data signals instead of the pilot signals, this problem in the receiving end can be solved.

Since it is preferred that the transfer symbol, to which at least two constellation mapping methods are applied, is transmitted by the plurality of sub-carriers being orthogonal to each other as described above, the transfer symbol is transmitted to the receiving end by the OFDM transmitting data process.

As mentioned above, in this embodiment, since the additional data signals are contained in the data signal by various methods, hereinafter, a method of containing the additional data signals in the data signals to be transmitted will be described.

$$\overset{\rho}{S} = \mathrm{diag}\{r_1\exp(-j\theta_1), r_2\exp(-j\theta_2), \Lambda, r_{N_d}\exp(-j\theta_{N_d})\} P_d \overset{\rho}{S} + P_p \overset{\rho}{S} \quad \text{[Formula 7]}$$

The above formula, different from the formulas 5 and 6, represents a method of grouping the user data symbols to be contained in a single OFDM symbol and transmitting different additional data signals in the respective groups. $N_d$ indicates the number of the groups and $r_1\exp(-j\theta_1)$ to $r_{N_d}\exp(-j\theta_{N_d})$ indicate the additional data signals to be contained in the groups to be transmitted.

The $\mathrm{diag}\{r_1\exp(-j\theta_1), r_2\exp(-j\theta_2), \Lambda, r_{N_d}\exp(-j\theta_{N_d})\}$ indicates a method in which the respective phases and amplitudes are applied to the sub-carriers being allocated to the respective user data symbols. In Formula 7, $r_x$ and $\theta_x$ is an integer from 1 to $N_d$) have identical values with respect to the sub-carriers belonging to a single sub-carrier group, where the single sub-carrier group contains identical additional data signals.

Moreover, as described above, the additional data signals are mapped into the specific additional data symbols by the micro constellation mapping. The $\mathrm{diag}\{\ \}$ operation is an operation of converting a certain vector into a matrix, and the matrix has a diagonal vector component.

If the quantity of the additional data signals to be transmitted to the receiving end is great, it is preferred that, like the method expressed by the formula 7, the different additional data signals are contained in the respective groups of the user data symbols.

Consequently, a new additional channel may be provided between the transmitting end and the receiving end through the method of transmitting the additional data signals by further containing the additional data signals in the user data symbols.

Moreover, in this embodiment, in order to transmit the additional data signals by containing the additional data in the additional data signals, constellation information to modify the amplitude and the phase on a constellation map is used.

The transmitting end according to this embodiment is characterized in that control information with respect to the phase or the amplitude modified by the micro constellation mapping is not transmitted. Thus, the receiving end receives signals from the transmitting end and estimates and removes the micro constellation mapping to recover the data signals to which the macro constellation mapping is carried out. Hereinafter, operation of the receiving end will be described.

FIG. 4 is a view illustrating the receiving end to receive receiving signals, containing additional data signal, according to this embodiment of the present invention. The receiving end according to this embodiment includes a serial-to-parallel (S/P) converter 480 to convert a serial input into a parallel output, an N-point fast Fourier transform (FFT) 470, a demultiplexer (deMUX) 460 to distinguish data and pilots mixed according to a predetermined rule, a channel estimating and equalizer 450 to estimate a channel using the pilots and to recover a constellation coordinate on a constellation map of the data through the estimated channel, a parallel-to-serial (P/S) converter 440 to convert a parallel input into a serial output, a module 430 to generate a constellation group from the equalized data signals and to estimate the micro constellation mapping of finding a micro constellation signal from the constellation group, a demapping module 420 to recover the micro constellation mapping of finding the data transmitted from the micro constellation signals to acquire the additional data, and a demapping module 410 to recover the macro constellation mapping to acquire the user data.

The OFDM signal received through the channel firstly undergoes the S/P conversion and the converted signal is converted into a signal in the frequency domain through an FFT block. A channel of this converted signal is estimated through the pilots and the data signal is equalized. If the pilot signals are received to estimate the channel in a maximum likelihood method, the following estimating value can be obtained.

$$\begin{bmatrix}\hat{h}\\0\end{bmatrix} = a^H (F^H V_P^H V_P F)^{-1} F^H V_P^H \overset{\rho}{V_R} \text{ or}$$

$$\begin{bmatrix}\hat{h}\\0\end{bmatrix} = (F^H V_P^H V_P F)^{-1} F^H V_P^H \overset{\rho}{V_R} \quad \text{[Formula 8]}$$

where, 'a' represents $r_p\exp(-j\theta_p)$, 'F' represents a Fourier transform matrix, and $V_P$ is an diagonal matrix. When only the pilot components transmitted from the transmitting end are selected to express a vector of a length N (where non-pilot elements of the vector are filled with '0' (zero)), the vector of the length N becomes an diagonal element of the $V_P$. $\overset{\rho_P}{V_R}$ represents a pilot component of a received signal vector $\overset{\rho}{V_R}$. The first value in the formula 8 is an estimated value when the additional data signals are contained in the pilot signals, and the second value is an estimated value when the additional data signals are contained in the data signals. The estimated channel response is converted into the frequency domain to find a channel value with respect to positions of the sub-carriers of the respective data symbols as expressed by the following formula 9.

$$\hat{H} = F \begin{bmatrix} \hat{h} \\ 0 \end{bmatrix}$$ [Formula 9]

When signals of the positions of the sub-carriers to transmit the data symbols through the estimated channel are equalized, the following formula 10 can be expressed. The formula 10 is an example of a case of containing the additional data signals in the pilot signals and transmitting the same.

$$\hat{v}_s = (P_d^H \hat{H}^H \hat{H} P_d)^{-1} \hat{H} P_d \hat{v}_R^d =$$ [Formula 10]
$$r_P^3 \exp(-j\theta_P)(P_d^H \overline{H}^H \overline{H} P_d)^{-1} \overline{H} P_d \hat{v}_R^d$$

where, $\overline{H} = \hat{H}/\alpha^H$, and $\hat{v}_R^d$ is a vector corresponding to data components in the received signal vector $\hat{v}$. When the additional data contained in the data components are transmitted, additional information is expressed in the simple form like formula 11.

$$\hat{v}_s = r_P \exp(-j\theta_P)(P_d^H \hat{H}^H \hat{H} P_d)^{-1} \hat{H} P_d \hat{v}_R^d$$ [Formula 11]

Figure 5:
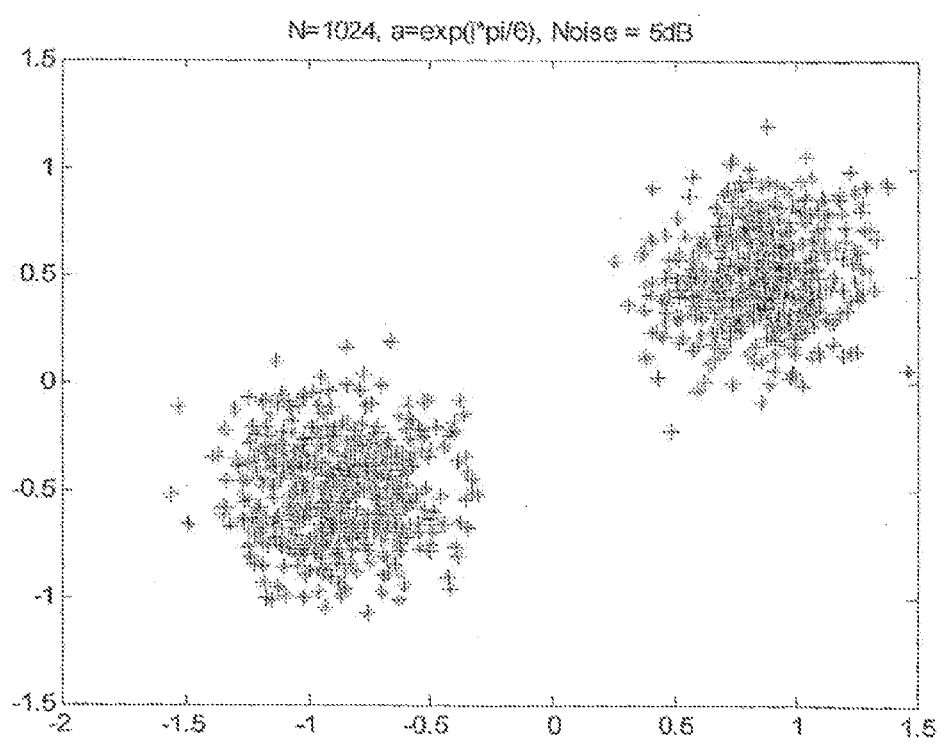
FIG. 5 is a view illustrating a constellation map of data in which a macro constellation mapping is carried out by a binary phase shift keying (BPSK) and a micro constellation is carried out.

The constellation of the data signals estimated from the formulas 10 or 11 takes a form rotated by a predetermined value according to additionally contained data. Moreover, amplitude of the constellation coordinates can be changed according to additionally contained data. FIG. 5 is a view illustrating a constellation map of data in which the macro constellation mapping is carried out by a binary phase shift keying (BPSK) and the micro constellation is carried out. FIG. 5 illustrates a result when the amplitude of the additional data signal is set to 1 (one) and the phase thereof is set to 30 degrees.

In this embodiment, it is preferred that the channel estimation and the equalization are carried out in order for the correct demodulation of the receiving end. This embodiment proposes a method of estimating and recovering an amplitude and a phase corresponding to respective data symbols (the user data signals, the pilot signal, and the additional data signals that are transmitted by the transmitting end) received through the respective orthogonal sub-carriers. The data symbols, received through the respective sub-carriers, are data symbols that are received through a receiving antenna and are undergone by the serial-to-parallel conversion and the FFT conversion, and hereinafter, are referred to as 'received symbols'. Consequently, the received symbols in this embodiment are data symbols corresponding to transmitted symbols to which two constellation mappings are applied in the transmitting end, and two constellation demappings are carried out to the received symbols so that the additional data signals and the user data signals can be recovered.

As described above, the transmitting end in this embodiment does not provide information about $r_P$ and $\theta_P$ to the receiving end, and as known through FIG. 5, since the receiving end receives signals different from already known BPSK constellation, the receiving end is able to estimate the information about the micro constellation ($r_P$ and $\theta_P$) without help of the transmitting end.

In a case as illustrated in FIG. 5, although the amplitude (namely, $r_P$=1) is not varied, since the phase is changed, the phase is rotated in comparison to the conventional BPSK so that the rotated quantity can be estimated. However, in order to estimate the rotated quantity, there is a problem of knowing correct values of the respective data symbols. Thus, the module 430 to estimate the micro constellation mapping uses a technique of finding the correct values of the respective received symbols.

Firstly, since information for the respective data is not known, the added amplitude and phase (the micro constellation) must be obtained by grouping the respective data and mapping the same in the constellation (the macro constellation) of the original data according to the constellation coordinates gathered on the constellation map. Since a single OFDM symbol contains a plurality of data symbols, the constellations with respect to a plurality of received symbols (namely, amplitudes and phases corresponding to the respective received symbols) can be acquired at once, and these plural constellations are compared with the macro constellation so that the information about the micro constellation can be estimated.

Hereinafter, an example of algorithms of estimating the amplitudes and the phases added by the micro constellation mapping will be described.

1. Allocating a single sample to a certain group
2. Updating centroids of K groups using the following formula. This is a procedure of calculating centers of gravity of the respective groups.

$$m_j = \frac{1}{N} \sum_{P=0}^{N_j - 1} d_P^j$$ [Formula 12]

where, $m_j$ is a centroid of a group, $N_j$ is the number of samples belonged to a corresponding group, and $d_P^j$ is a sample pth belonged to jth group.

3. By taking the number of data belonging to the respective groups into consideration, a weight coefficient is determined and K centroids are renewed again on the basis of the determined weight coefficient. In other words, the center of gravity is renewed to be mostly similar to the respective constellation points.

$$J = \frac{\sum_{k=1}^{K} w_k (X_k - m_k)^2}{\sum_{k=1}^{K} w_k} = \frac{\sum_{k=1}^{K} w_k (X_1 \exp(j(k-1)\theta_X) - m_k)^2}{\sum_{k=1}^{K} w_k}$$ [Formula 13]

$$\frac{\partial J}{\partial X_1} = \frac{\sum_{k=1}^{K} 2 w_k (X_1 - m_k \exp(-j(k-1)\theta_X))}{\sum_{k=1}^{K} w_k}$$ [Formula 14]

$$X_1 = \frac{\sum_{k=1}^{K} w_k m_k \exp(-j(k-1)\theta_X)}{\sum_{k=1}^{K} w_k}$$ [Formula 15]

where, $X_k$ is kth macro constellation point, and $W_k$ is a weight coefficient and equal to $N_j$. $\theta_x$ is an angular rotation value between the constellation coordinates. $\theta_x$ is, for example, 90 degrees in the M-ary QAM and 180 degrees in the BPSK.

4. When there are unallocated samples, one of the unallocated samples is selected to allocate the selected one to the nearest group of the K groups.

5. The procedures 2, 3, and 4 are repeated with respect to the newly allocated sample.

The transmitting end according to this embodiment additionally transmits the additional data signals by carrying out the micro constellation mapping, and the receiving end according to this embodiment spontaneously estimates information about the micro constellation mapping to recover the additional data signals transmitted by the micro constellation mapping and the user data signals transmitted by the macro constellation mapping. Hereinafter, a method of determining the constellation coordinate of the micro constellation mapping used in the transmitting end and the receiving end will be described.

Figure 6A:
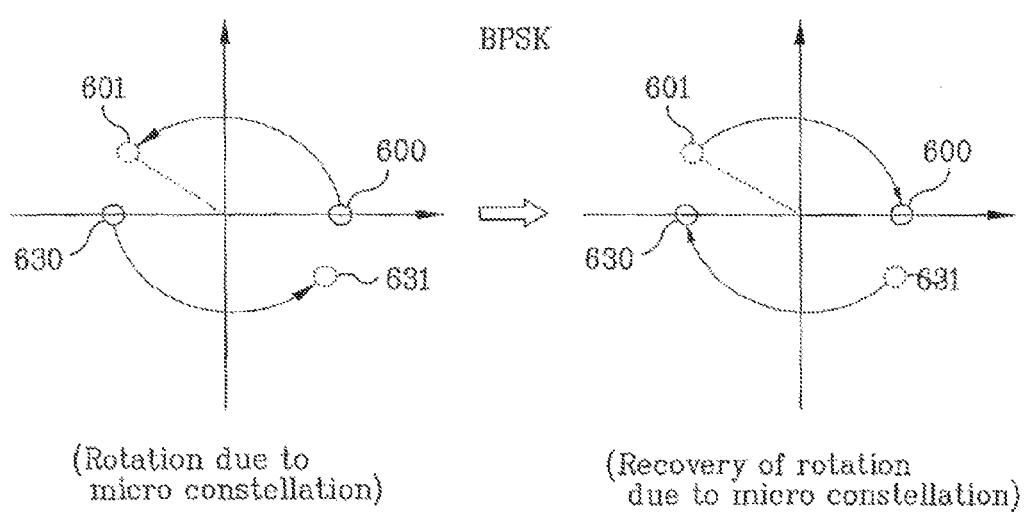
FIG. 6A illustrates a phase range that a micro constellation coordinate may have when the macro constellation mapping is the BPSK.

The coordinate of the micro constellation must be within a range of distinguishing the coordinate of the macro constellation. FIG. 6A illustrates a phase range that the micro constellation coordinate may have when the macro constellation mapping is the BPSK. Reference numerals 600 and 630 in the drawing represent the macro constellation coordinates mapped by the macro constellation mapping. Moreover, reference numerals 601 and 631 are assigned to the constellation coordinates in which the macro constellation coordinates are rotated by the micro constellation mapping.

A left-side of FIG. 6A indicates constellation coordinates rotated by the micro constellation. The transmitting end rotates the constellation coordinates 600 and 630 in which the additional data signal are not contained. By the rotating operation, the constellation coordinates 601 and 631 are generated.

A right-side of FIG. 6A illustrates a concept that the receiving end recovers the constellation coordinates. The receiving end acquires the additional data signals through the constellation coordinates 601 and 631 with respect to the transfer signals in which the additional data signals are contained and eliminates the rotated components due to the micro constellation mapping to recover the constellation coordinates 600 and 630 due to the original macro constellation mapping.

If the receiving end fixes the direction of recovering the constellation coordinates to the clockwise direction or the counterclockwise direction, when the macro constellation mapping is the BPSK, the receiving end can correctly recover the constellation coordinates although the phase is rotated by 0 degrees to 180 degrees by the micro constellation mapping.

Figure 6B:
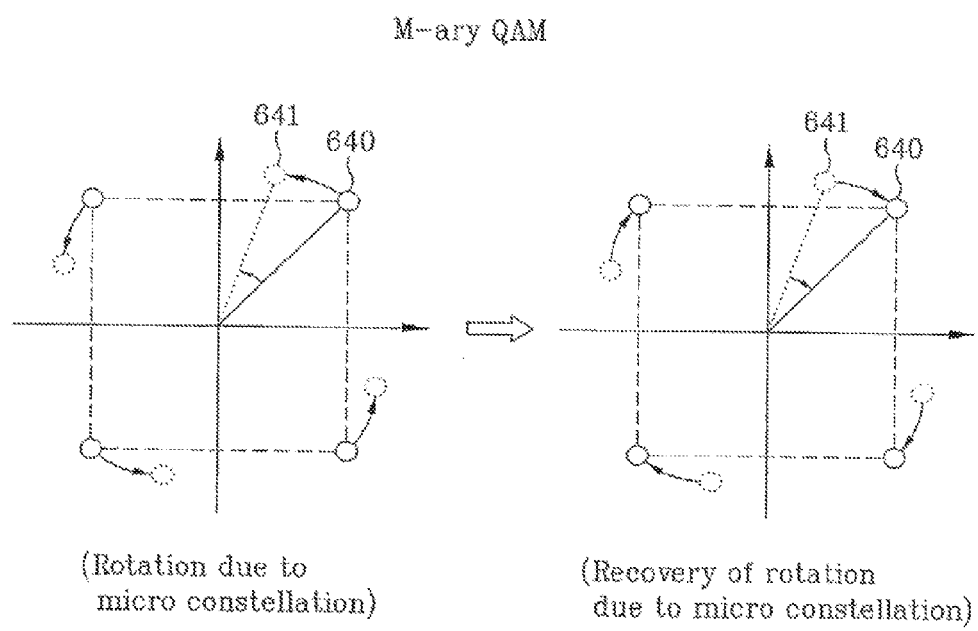
FIG. 6B illustrates a range of a value that the micro constellation coordinate may have when the macro constellation mapping is an M-ary quadrature amplitude modulation (QAM)

FIG. 6B illustrates a range of values that the micro constellation coordinates may have when the macro constellation mapping is the M-ary quadrature amplitude modulation (QAM). A reference numeral 640 in the drawing indicates one of the macro constellation coordinates mapped by the macro constellation mapping in the M-ary QAM method, and reference numeral 641 indicates constellation coordinates in which the macro constellation coordinates 640 are rotated by the micro constellation mapping. As illustrated in the left-side of FIG. 6B, when a usual M-ary QAM type macro constellation coordinate is rotated by 0 degrees to 90 degrees, the receiving end can correctly receive the same without additional control information. The receiving end can acquire the constellation coordinates, the phases of which are rotated by the micro constellation mapping, and can recover the constellation coordinates into the conventional macro constellation coordinates. In other words, if the receiving end fixes the direction of recovering the constellation coordinates to the clockwise direction or the counterclockwise direction, when the macro constellation mapping is the M-ary QAM, the receiving end can correctly recover the constellation coordinates although the phases are rotated by 0 degrees to 90 degrees by the micro constellation mapping.

Consequently, when the macro constellation mapping is the BPSK, the change of the phases due to the micro constellation mapping must be 0 degrees to 180 degrees. Moreover, when the macro constellation mapping is the M-ary QAM, the change of the phases caused by the micro constellation mapping must be 0 degrees to 90 degrees.

As described above, since the range of the variation of the phases in the micro constellation mapping is restricted to a predetermined value, the micro constellation mapping can be determined by various methods within the range of the phase variation. By changing the micro constellation mapping, the conversion relationship between the additional data bits and the data symbols due to the same is determined. Such micro constellation mapping is preferably determined by a communication circumstance such as a permissible error ratio.

FIG. 7 is a view illustrating a result that the micro constellation coordinate is generated when the macro constellation mapping is the BPSK. FIG. 7(a) illustrates an example of using μ-BPSK as the micro constellation mapping when the macro constellation mapping is the BPSK, FIG. 7(b) illustrates an example of using μ-QPSK as the micro constellation mapping when the macro constellation mapping is the BPSK, and FIG. 7(c) illustrates an example of using μ-8 PSK as the micro constellation mapping when the macro constellation mapping is the BPSK.

As described above, when the macro constellation mapping is the BPSK, the phase rotation due to the micro constellation mapping is restricted to 0 degrees to 180 degrees. The μ-BPSK means a method of selecting two phase values between 0 degrees to 180 degrees, for example, 45 degrees and 135 degrees to transmit the additional data. Since the constellation coordinate due to the macro constellation mapping is identical to a reference numeral 700, a constellation coordinate indicated by a reference numeral 701 is obtained when a phase rotation of 45 degrees is applied, and a constellation coordinate indicated by a reference numeral 702 is obtained when a phase rotation of 135 degrees is applied. If the μ-BPSK as the micro constellation mapping is used between the transmitting end and the receiving end, a transmitting end per group, to which the micro constellation mapping is applied, can provide 1 (one) additional data bit through the micro constellation mapping. The μ-QPSK means a method of selecting four phase values from 0 degrees to 180 degrees to transmit the additional data.

In FIG. 7(b) illustrating an example of the p-QPSK, a reference numeral 730 is assigned to a constellation coordinate due to the macro constellation mapping, and reference numerals 731, 732, 733, and 734 are assigned to micro constellation coordinates due to the phase rotation. Moreover, the μ-8 PSK means a method of selecting eight phase values from 0 degrees to 180 degrees to transmit the additional data.

In FIG. 7(c) illustrating an example of the μ-8 PSK, a reference numeral 760 is assigned to a constellation coordinate due to the macro constellation mapping, and reference numerals 761, 762, 763, 764, 765, 766, 766, and 768 are assigned to micro constellation coordinates due to the phase rotation. Since the above-mentioned micro constellation mapping is only an example of the micro constellation mapping according to the present invention, various micro constellation mappings are enabled by a phase conversion or an amplitude conversion according to the micro constellation.

Figure 8:
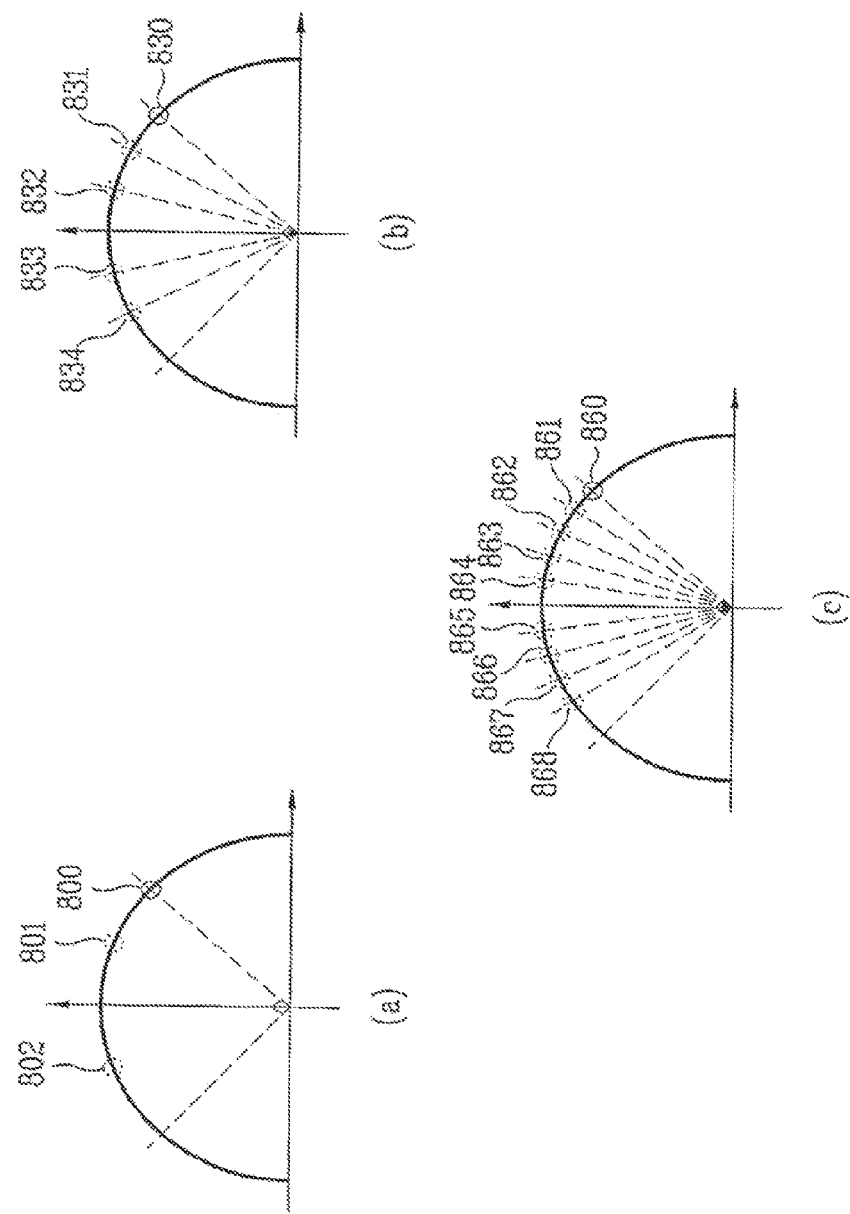
FIG. 8 is a view illustrating a result that the micro constellation coordinate is generated when the macro constellation mapping is the M-ary QAM.

FIG. 8 is a view illustrating a result that the micro constellation coordinate is generated when the macro constellation mapping is the M-ary QAM. FIG. 8(a) illustrates an example of using μ-BPSK as the micro constellation mapping when the macro constellation mapping is the M-ary QAM, FIG. 8(b) illustrates an example of using μ-QPSK as the micro constellation mapping when the macro constellation mapping is the M-ary QAM, and FIG. 8(c) illustrates an example of using μ-8 PSK as the micro constellation mapping when the macro constellation mapping is the M-ary QAM.

As described above, when the macro constellation mapping is the M-ary QAM, the phase rotation due to the micro constellation mapping is restricted to 0 degrees to 90 degrees. The μ-BPSK means a method of selecting two phase values between 0 degrees to 90 degrees, for example, 30 degrees and 60 degrees to transmit the additional data. Since the constellation coordinate due to the macro constellation mapping is identical to a reference numeral 800, a constellation coordinate indicated by a reference numeral 801 is obtained when a phase rotation of 30 degrees is applied, and a constellation coordinate indicated by a reference numeral 802 is obtained when a phase rotation of 60 degrees is applied.

If the μ-BPSK as the micro constellation mapping is used between the transmitting end and the receiving end, a transmitting end per group, to which the micro constellation mapping is applied, can provide 1 (one) additional data bit in the micro constellation mapping. The μ-QPSK means a method of selecting four phase values from 0 degrees to 90 degrees to transmit the additional data.

In FIG. 8(b) illustrating an example of the μ-QPSK, a reference numeral 830 is assigned to a constellation coordinate due to the macro constellation mapping, and reference numerals 831, 832, 833, and 834 are assigned to micro constellation coordinates due to the phase rotation. Moreover, the μ-8 PSK means a method of selecting eight phase values from 0 degrees to 90 degrees to transmit the additional data.

In FIG. 8(c) illustrating an example of the μ-8 PSK, a reference numeral 860 is assigned to a constellation coordinate due to the macro constellation mapping, and reference numerals 861, 862, 863, 864, 865, 866, 866, and 868 are assigned to micro constellation coordinates due to the phase rotation.

Figure 9:
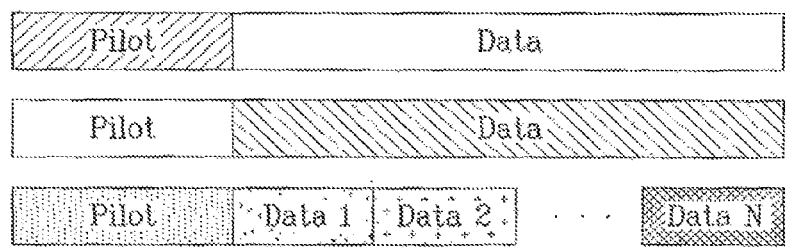
FIG. 9 is a view illustrating a concept of a method of transmitting data by containing additional data in the data according to an embodiment of the present invention.

FIG. 9 is a view illustrating a concept of a method of transmitting data by containing additional data in the data according to the embodiment of the present invention. As illustrated in FIG. 9, identical additional data can be contained in the conventional pilot signals to be transmitted, and identical additional data can be contained in the conventional data signals to be transmitted. Moreover, the additional data are differently contained in respective specific sub-carriers and are transmitted.

Figure 10:
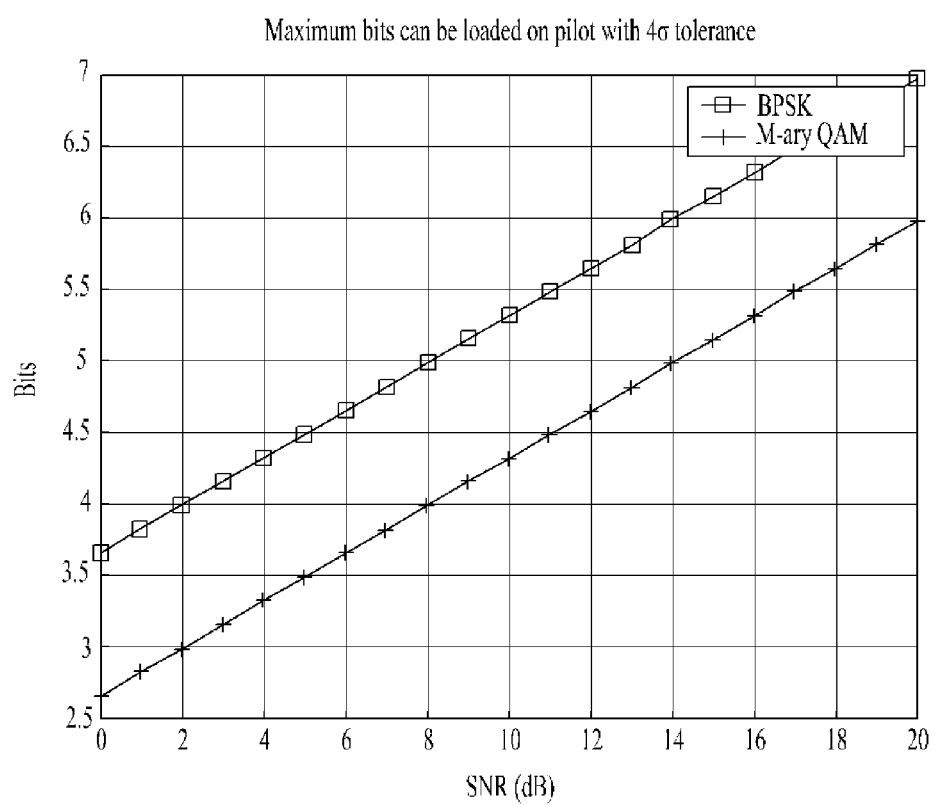
FIG. 10 is a view illustrating a maximum value of the additional data to be contained in a pilot signal and to be transmitted in the embodiment of the present invention.

FIG. 10 is a view illustrating a maximum value of the additional data contained in the pilot signals to be transmitted in the embodiment of the present invention. When the OFDM symbols are transmitted by 1024 sub-carriers, the quantity of the additional data to be transmitted according to a channel circumstance is illustrated in the drawing.

Figure 11:
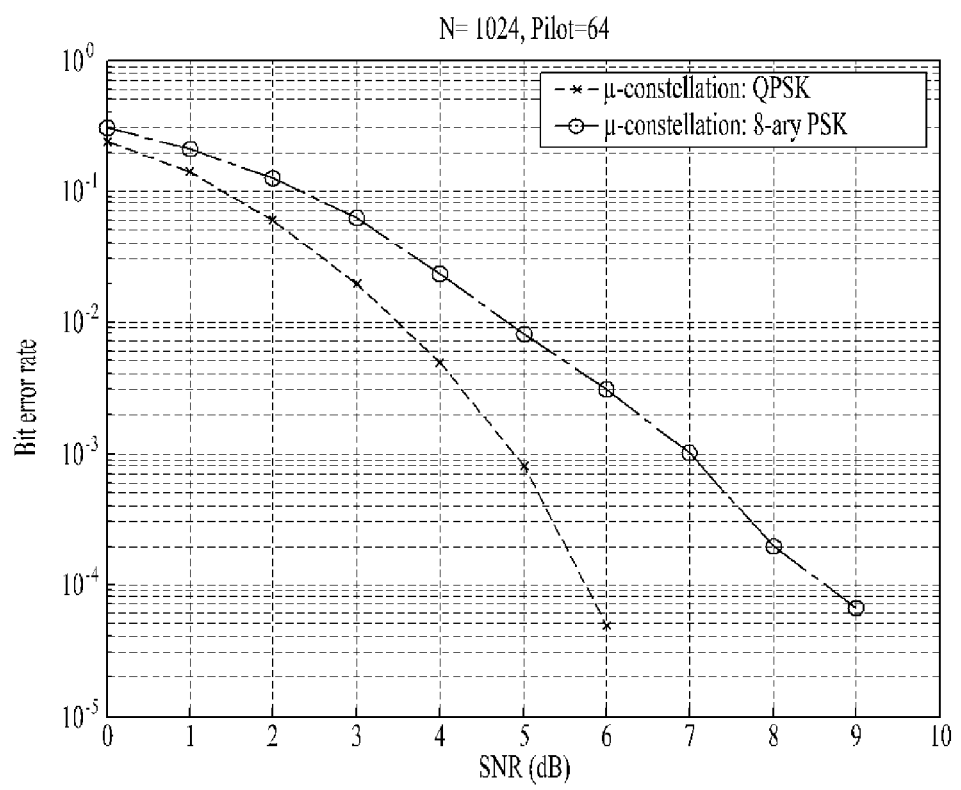
FIG. 11 is a view illustrating an error ratio with respect to the additional data when the additional data is contained in the pilot signal to be transmitted in the embodiment of the present invention.

FIG. 11 is a view illustrating an error rate with respect to the additional data when the additional data is contained in the pilot signals to be transmitted in the embodiment of the present invention. When the OFDM symbols are transmitted by 1024 sub-carriers, a bit error rate (BER) according to a channel circumstance is illustrated in the drawing.

Figure 12:
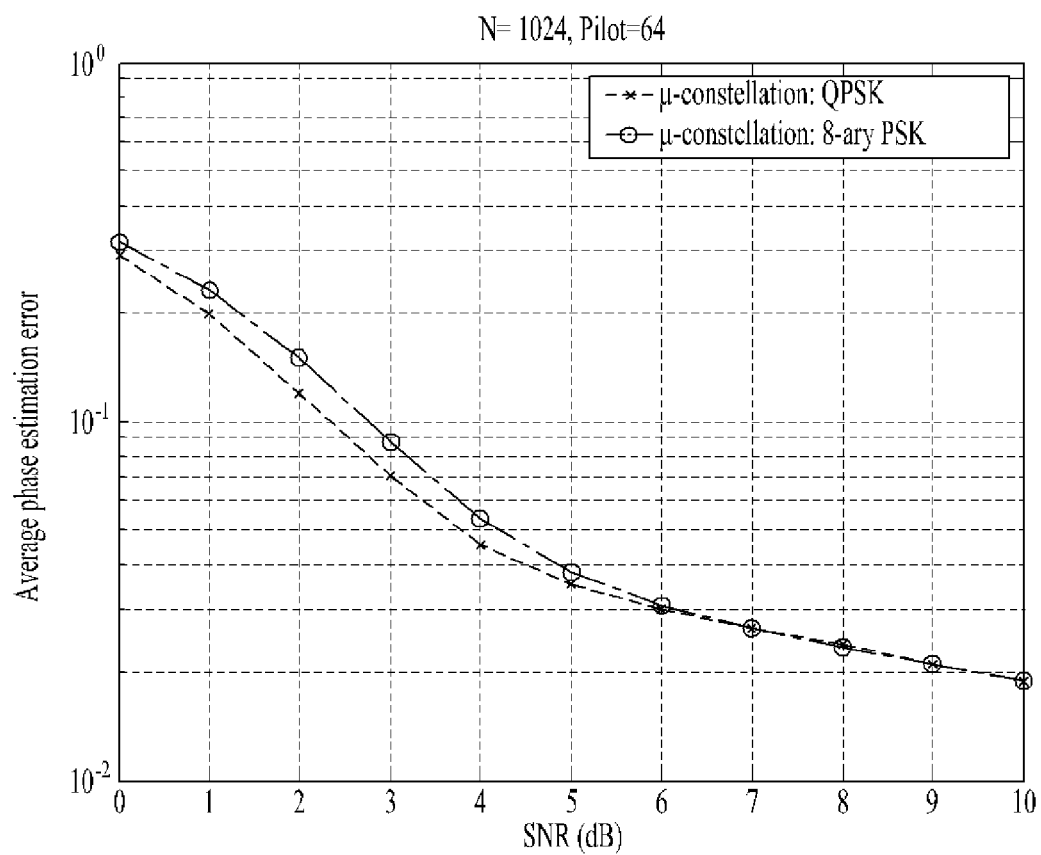
FIG. 12 is a view illustrating an error ratio of phase estimation with respect to a micro constellation signal when the additional data is contained in the pilot signal to be transmitted in the embodiment of the present invention.

FIG. 12 is a view illustrating an error rate of the phase estimation with respect to the micro constellation signal when the additional data is contained in the pilot signals to be transmitted in the embodiment of the present invention. When the OFDM symbols are transmitted by 1024 sub-carriers, the error ratio of the phase estimation with respect to the micro constellation signal according to a channel circumstance is illustrated in the drawing.

Figure 13:
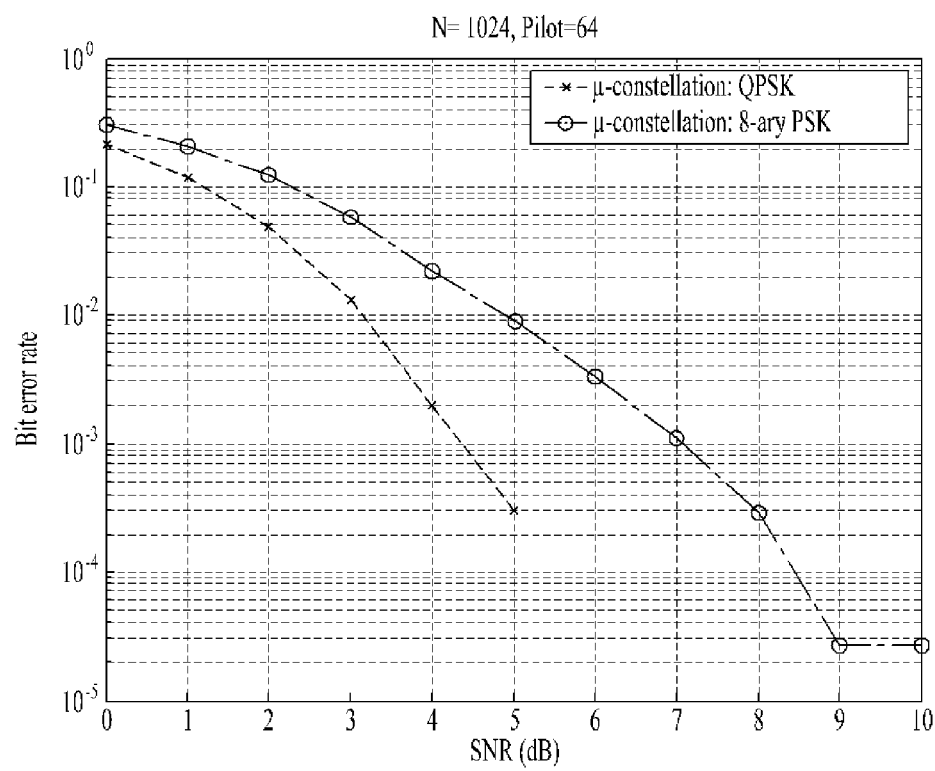
FIG. 13 is a view illustrating an error ratio with respect to the additional data when the additional data is contained in a data signal to be transmitted in the embodiment of the present invention.

FIG. 13 is a view illustrating an error rate with respect to the additional data when the additional data is contained in the data signals to be transmitted in the embodiment of the present invention. When the OFDM symbols are transmitted by 1024 sub-carriers, the BER according to a channel circumstance is illustrated in the drawing.

Figure 14:
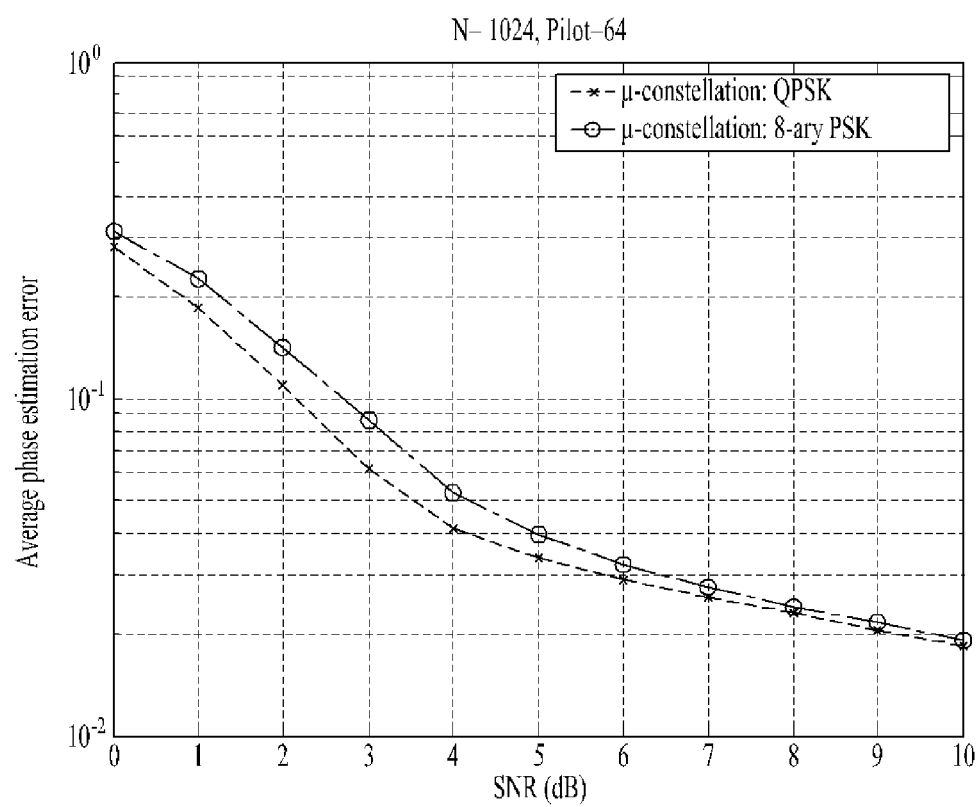
FIG. 14 is a view illustrating an error ratio of phase estimation with respect to the micro constellation signal when the additional data is contained in the data signal to be transmitted in the embodiment of the present invention.

FIG. 14 is a view illustrating an error ratio of the phase estimation with respect to the micro constellation signals when the additional data is contained in the data signals to be transmitted in the embodiment of the present invention. When the OFDM symbols are transmitted by 1024 sub-carriers, the error ratio of the phase estimation with respect to the micro constellation signal according to a channel circumstance is illustrated in the drawing.

Hereinafter, as one of various methods of using the micro constellation mapping proposed in the above-mentioned first embodiment, a method of transmitting and receiving information about the PAPR by the micro constellation mapping will be described.

Embodiment 2

In the second embodiment of the present invention, a method of reducing the PAPR in the OFDM communication system is provided.

In the second embodiment, a specific phase shift is carried out to a group of the sub-carriers containing at least two sub-carriers in order to reduce the PAPR. In this embodiment, a phase component is multiplied to generate the phase shift so that the PAPR is reduced but neither additional sub-carrier is allocated to transmit additional information about the phase component nor power is increased.

The second embodiment is characterized in that respective transfer symbols, in which the phase shift is performed, contain the additional information to indicate the phase component and are transmitted. In this embodiment, in order to distinguish the additional information and the phase component from each other, phases of the symbols transmitted by the group of the sub-carriers are controlled.

Figure 15:
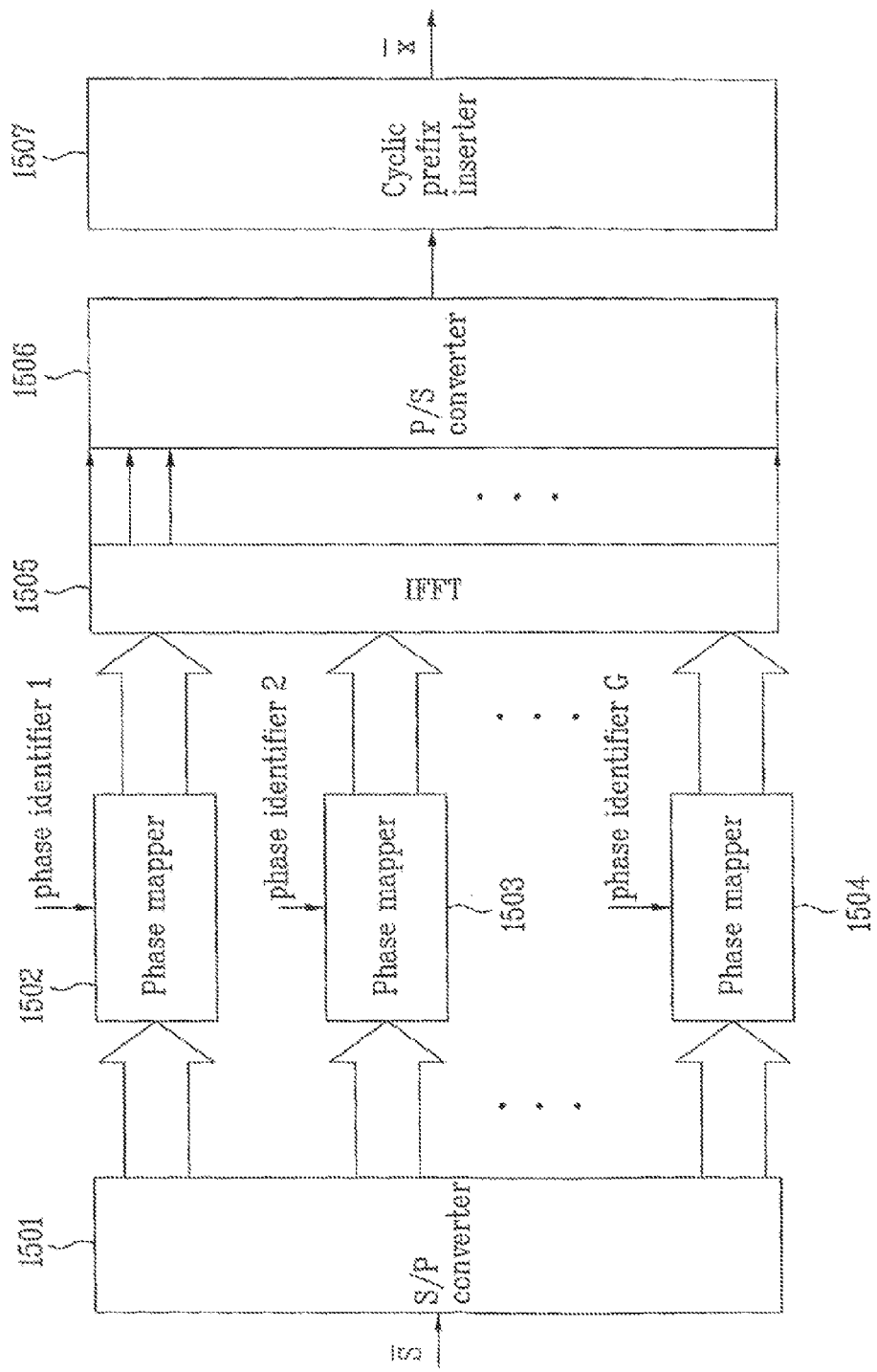
FIG. 15 is a view illustrating an example of an OFDM signal transmitting end to reduce PAPR according to an embodiment of the present invention.

FIG. 15 is a view illustrating an example of an OFDM signal transmitting end to reduce PAPR according to an embodiment of the present invention. In FIG. 15, ¥ represent a data symbol transmitted by the transmitting end. The data symbols are generated by the macro constellation mapping such as the BPSK, QPSK, the M-ary PSK, the M-ary QAM, and the like. Moreover, a phase identifier in FIG. 15 is identifying information representing a PAPR code that is applied to a specific sub-carrier group. The PAPR code is multiplied to the sub-carrier group to indicate data containing a phase component of reducing the PAPR of the OFDM signals. Since this embodiment uses modulated data to control the phases of transfer signals that are transmitted by the specific sub-carrier group, the modulated data has no restriction of own kind when the modulated data control the phases of the transfer signals. For example, the modulated data may be the phase components to rotate the phases of the transfer signals that are transmitted by the specific sub-carrier group.

Hereinafter, operation of the transmitting end will be described. The data symbols transmitted by the transmitting end are converted into parallel signals by a serial-to-parallel (S/P) converter 1501. The PAPR code of reducing the PAPR is applied to the parallel signals by phase mappers 1502, 1503, and 1504, and the parallel signals contain additional information of indicating the PAPR code. The signals containing the PAPR code and the additional information are converted into the OFDM signals by an IFFT module 1505, a parallel-to-serial (P/S) converter 1506, and a cyclic prefix inserter 1507.

The transmitting end according to this embodiment applies the PAPR code to the sub-carrier group through the phase mappers 1502, 1503, and 1504. Moreover, the phase mappers 1502, 1503, and 1504 use a micro constellation mapping distinguished from the conventional macro constellation mapping for the user data signals and the pilot signals to contain the additional information of identifying the PAPR code by the receiving end.

Figure 16:
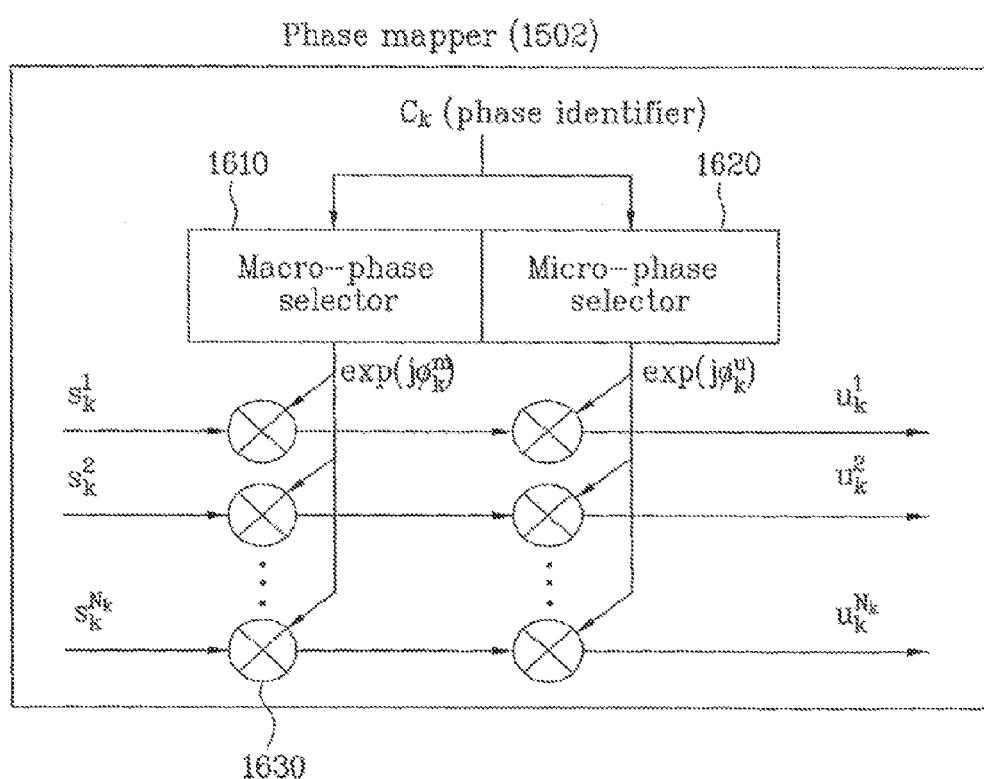
FIG. 16 is a view illustrating an example of a phase mapper according to an embodiment of the present invention.

FIG. 16 is a view illustrating an example of a phase mapper 1502 according to this embodiment of the present invention. The phase mapper 1502 includes a macro phase selector 1610 to apply the PAPR code to the sub-carrier group, a micro phase selector 1620 to contain the additional information in which the receiving end identifies the PAPR code without additional control information, and at least one multiplier 1630 to multiply a macro phase or a micro phase to the transfer symbols. Hereinafter, operation of the phase mappers will be described with reference to FIG. 16.

The phase mappers 1502, 1503, and 1504 apply the PAPR code to any one of at least one sub-carrier group. When the sub-carrier group is called k, $s_k^i$ represents an ith transfer symbol (a data symbol or a pilot symbol) of a kth group, and $C_k$ is an identifier representing the PAPR code to be applied to the kth sub-carrier group. Since $\phi_k^m$ represents the PAPR code with respect to the kth sub-carrier group indicated by $C_k$, $\phi_k^m$ represents a phase rotated by the PAPR code. $\phi_k^u$ represents additional information for informing a value of $\phi_k^m$ to the receiving end, namely, the phase due to the micro constellation mapping. Consequently, the transfer symbol undergoes phase shifts twice by $\phi_k^u$ and $\phi_k^m$. In other words, $\phi_k^m$ causes the phase shift for the reduction of the PAPR, and $\phi_k^u$ causes the phase shift for indicating information about $\phi_k^m$. In the present invention, the phases of the transfer signals are modified again using additional modulated data of indicating the modulated data to reduce the PAPR. The modulated data to modify the phases of the transfer signals again indicate data of controlling the phases of the transfer signals, for example, the data may be phase components to change the phases with respect to a specific sub-carrier group.

As described above, in this embodiment, the phases are changed twice, and the transmitted signals through the sub-carrier group are expressed by the following formula.

$$u_k^i = \exp(j(\phi_k^m + \phi_k^u))s_k^i \qquad \text{[Formula 16]}$$

Figure 17A:
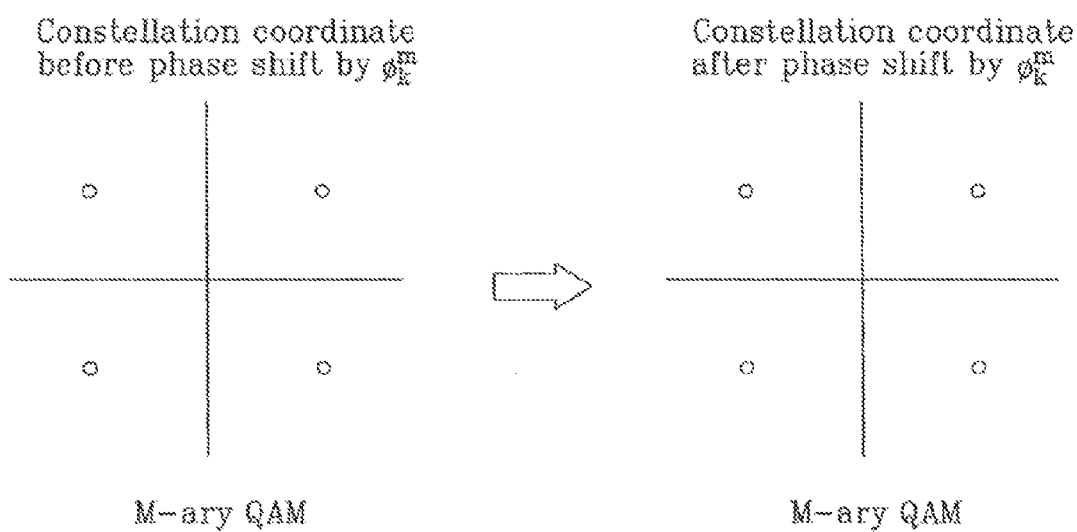
FIG. 17A is a view illustrating a method of selecting a value of $\phi_k^m$ when the macro constellation mapping is the M-ary QAM.

As described above, in order for the receiving end to recover the signals in which the phase shifts occur twice, a predetermined condition must be satisfied. The transfer symbol has a specific phase value due to the macro constellation mapping and undergoes the phase shifts twice by $\phi_k^u$ and $\phi_k^m$. Thus, in order for the receiving end to correctly receive, constellation coordinates caused by the macro constellation mapping must not changed by the phase shift due to $\phi_k^m$. The constellation coordinates represent overall coordinates of the transfer symbols marked on the constellation map. FIG. 17A is a view illustrating a method of selecting a value of $\phi_k^m$ when the macro constellation mapping is the M-ary QAM. In this embodiment, in order for the receiving end to correctly receive, as illustrated in FIG. 17A, the constellation coordinates must not changed by the phase shift due to $\phi_k^m$. Thus, when the macro constellation mapping is the M-ary QAM, $\phi_k^m$ is determined by the following formula.

$$\phi_k^m = \left\{0, \frac{\pi}{2}, \pi, \frac{3\pi}{2}\right\} \qquad \text{[Formula 17]}$$

In other words, when the macro constellation mapping is the M-ary QAM, $\phi_k^m$ may be selected by one of the phases contained in the formula 17 to be used. As described above, when $\phi_k^m$ is one of 0 degree phase, 90 degree phase, 180 degree phase, and 270 degree phase, overall arrangement of the constellation coordinate due to the M-ary QAM is not changed. If all phases expressed by the formula 17 are used, the phase identifier $C_k$ to identify $\phi_k^m$ may be expressed by 2-bit information. moreover, when $\{0, \pi\}$ is used from the phases expressed by the formula 17, the phase identifier $C_k$ to identify $\phi_k^m$ may be expressed by 1-bit information.

Figure 17B:
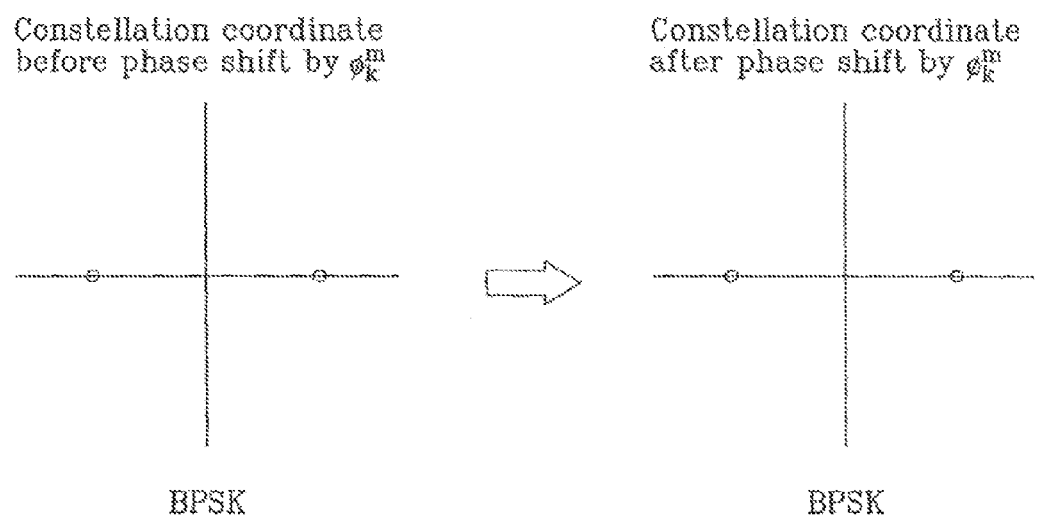
FIG. 17B is a view illustrating a method of selecting a value of $\phi_k^m$ when the macro constellation mapping is the BPSK.

FIG. 17B is a view illustrating a method of selecting a value of $\phi_k^m$ when the macro constellation mapping is the BPSK. In this embodiment, in order for the receiving end to correctly receive, as illustrated in FIG. 17B, the constellation coordinates must not changed by the phase shift due to $\phi_k^m$. Thus, when the macro constellation mapping is the BPSK, $\phi_k^m$ is determined by the following formula.

$$\phi_k^m = \{0, \pi\} \qquad \text{[Formula 18]}$$

In other words, when the macro constellation mapping is the BPSK, $\phi_k^m$ may use the phases contained in the formula 18. If, when the phases expressed by the formula 18 are used, the phase identifier $C_k$ to identify $\phi_k^m$ may be expressed by 1-bit information.

As described above, when $\phi_k^m$ is determined, the receiving end determined the phase shift due to $\phi_k^u$. In other words, since the macro constellation mapping is determined by the transmitting end and the receiving end, if information in which $\phi_k^u$ indicates which $\phi_k^m$ is already notified to the transmitting end and the receiving end, the receiving end can determine $\phi_k^m$ the phase shift due to $\phi_k^u$.

Hereinafter, the transmitting end according to an embodiment of the present invention will be described.

Figure 18:
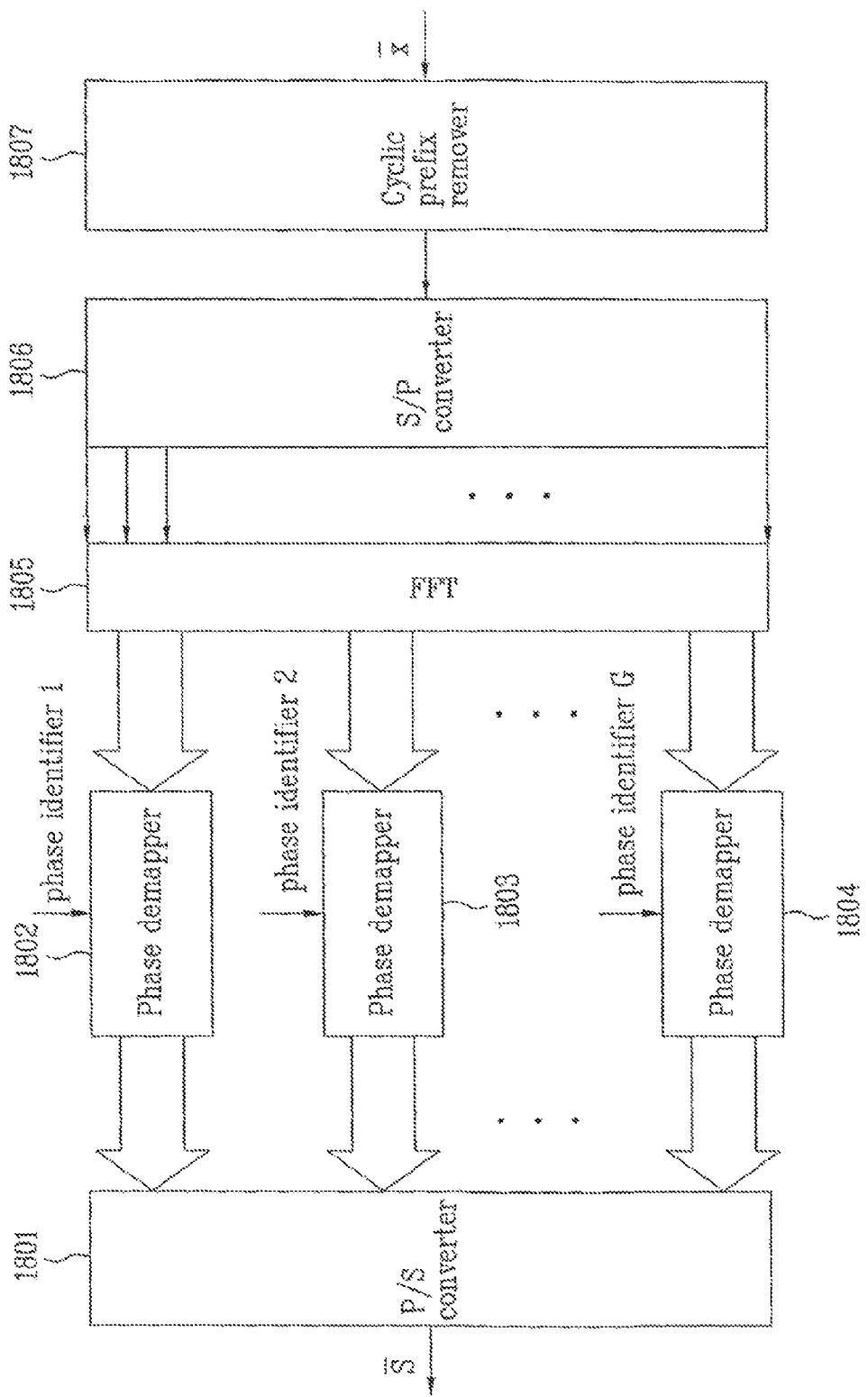
FIG. 18 illustrates configuration of a receiving end according to an embodiment of the present invention.

FIG. 18 illustrates configuration of the receiving end according to the embodiment of the present invention. The receiving end according to this embodiment includes a cyclic prefix remover 1807 to remove a cyclic prefix inserted by the transmitting end, a serial-to-parallel (S/P) converter 1806 to output a serially inputted sequence in the form of a parallel sequence, an FFT module 1805 to perform a FFT operation, at least one phase demapper 1802, 1803, or 1804 to remove a PAPR code applied to reduce the PAPR, and a parallel-to-serial (P/A) converter 1801 to output an inputted parallel vector in the form of a serial vector. In the drawing, $\check{v}$ represents a time domain signal vector of the OFDM signal received by the receiver, and $\check{v}$ represents the recovered data symbols. Hereinafter, operation of the receiving end will be described.

Figure 19A:
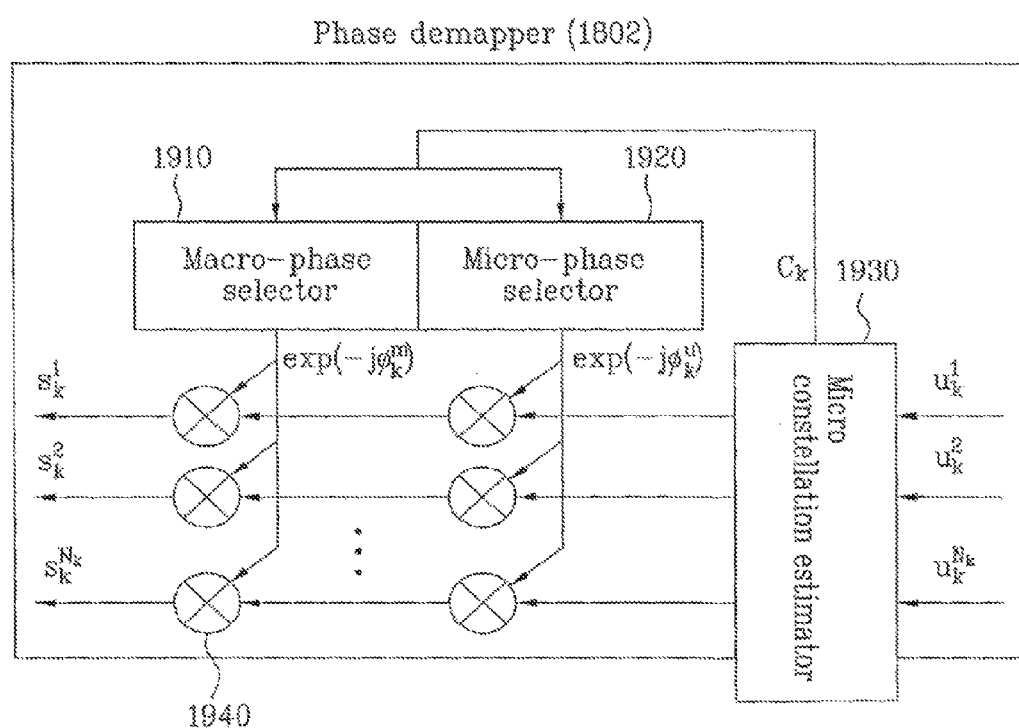
FIG. 19A is a view illustrating an example of a phase demapper according to an embodiment of the present invention.

The signal received by the receiving end is converted into the frequency domain signal after removing the cyclic prefix contained in the received signal. The received signal, since the PAPR code to reduce the PAPR is applied to the respective sub-carrier groups, must carry out an operation of removing the PAPR code in order to correctly demodulate the data. The operation of removing the PAPR code is carried out by one of the phase demappers. In other words, the phase demapper 1802 carries out the removal of the PAPR code with respect to the specific sub-carrier groups. FIG. 19A is a view illustrating an example of the phase demapper 1802 according to the embodiment of the present invention. The phase demapper 1802 includes a micro constellation estimator 1930 to estimate a phase due to the micro constellation mapping and to output the phase ID, a macro phase selector 1910 to select a PAPR code of reducing the PAPR according to information about the phase ID, a micro phase selector 1920 to select additional information representing the PAPR code, and at least one multiplier 1940 to multiply the outputs from the selectors 1910 and 1920 in reverse process (by changing plus/minus signs) than the case of the transmitting end according to this embodiment to remove the additional information and the PAPR code.

The micro constellation estimator 1930 is a module to estimate information about $\phi_k^u$ of representing $\phi_k^m$ for the reduction of the PAPR. As described above, the macro constellation mapping is already determined by the transmitting end and the receiving end, and the macro constellation coordinates due to the macro constellation mapping are not changed by $\phi_k^m$. Thus, the micro constellation estimator 1930 can correctly estimate $\phi_k^u$. The micro constellation estimator 1930 outputs the phase ID $C_k$ to the macro phase selector 1910 and the micro phase selector 1920 according to $\phi_k^u$ such that the phase selectors 1910 and 1920 acquire $\phi_k^m$ and $\phi_k^u$ that are used in the transmitting end according to this embodiment. The phase selectors 1910 and 1920, according to the information about the phase ID $C_k$, output $\phi_k^m$ and $\phi_k^u$ to the multiplier 1940 to remove the components of $\phi_k^m$ and $\phi_k^u$.

Since various algorithms can be used to estimate $\phi_k^u$, data to be obtained to estimate $\phi_k^u$ can be obtained by the following formulas.

$$X^C(\phi) = \left\{ \exp(j\phi)X_0, \exp\left(j\left(\frac{\pi}{2} - \phi\right)\right)X_0, \right.$$
$$\left. \exp\left(j\left(\frac{2\pi}{2} - \phi\right)\right)X_0, \exp\left(j\left(\frac{3\pi}{2} - \phi\right)\right)X_0 \right\}$$ [Formula 19]

$$J(u_k^i, X^C(\phi)) = \min_{n=0,1,2,3} \left| \exp\left(j\left(\frac{n\pi}{2} + \phi\right)\right) - u_k^i \right|^2$$ [Formula 20]

$$\hat{\phi}_k^{\prime u} = \arg \min_{\phi \in \Xi_0, \phi^{\mu_-}} \sum_{i=1}^{N_k} J(u_k^i, X^C(\phi))$$ [Formula 21]

In the above formulas, $\Phi^\mu$ is a maximal value of a phase range that the signal may have in the micro constellation method. Using a value obtained from the formula 21, $C_k$ is estimated and the corresponding $\phi_k^m$ is removed from the respective signals.

Figure 19B:
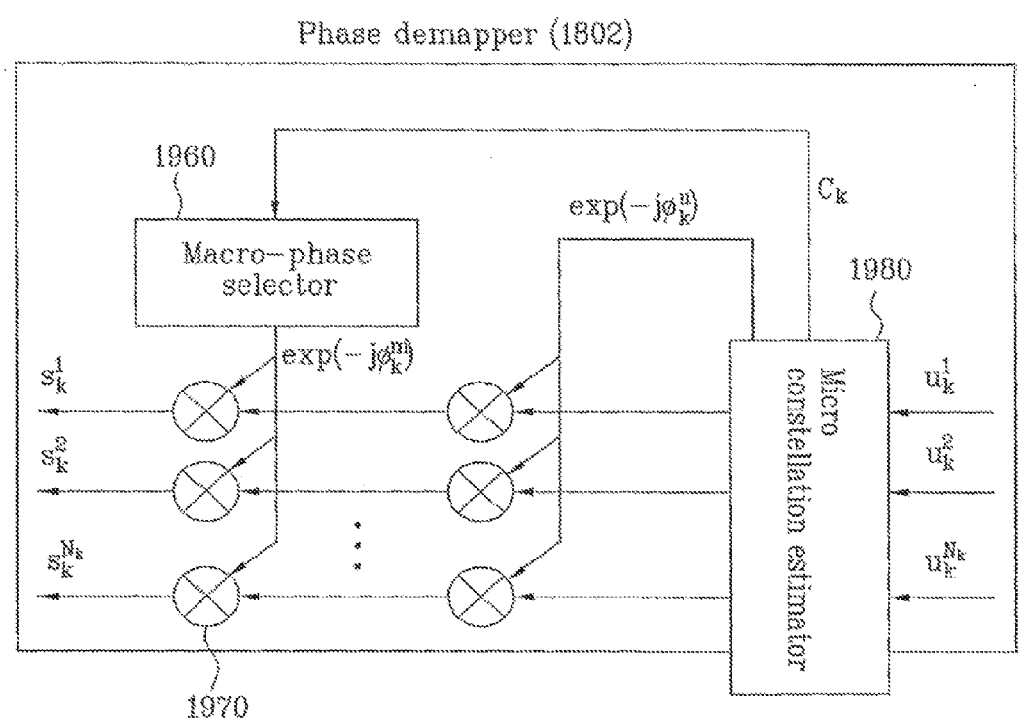
FIG. 19B is a view illustrating another example of the phase demapper according to an embodiment of the present invention.

FIG. 19B is a view illustrating another example of the phase demapper 1802 according to the embodiment of the present invention. The phase demapper 1802 in FIG. 19B includes a micro constellation estimator 1980 having the same algorithm as that of the phase demapper in FIG. 19A. However, the micro constellation estimator 1980 outputs the phase ID $C_k$ to a macro phase selector 1960 and outputs $\phi_k^u$ to at least one multiplier 1970. The phase demapper, when the micro constellation estimator has an error to determine the phase ID Ck, can prevent the error from being applied to $\phi_k^u$.

Hereinafter, when the macro constellation mapping is the BPSK and $\phi_k^m = \{0, \pi\}$, a method of calculating the phase in the transmitting end and the receiving end will be described. Since $\phi_k^m$ can be distinguished by 1-bit phase ID $C_k$, $\phi_k^m$ is determined as '0' (zero) and $\phi_k^u$ is determined as '0' (zero) when $C_k$ is '0' (zero) with respect to a specific sub-carrier group k, and $\phi_k^m$ is determined as 'π' (pi) and $\phi_k^u$ is determined as 'π/6' (pi/6) when $C_k$ is '1' (one). If the transmitting end according to this embodiment determines $\phi_k^m$ as '0' (zero) with respect to the specific sub-carrier group k in order to reduce the PAPR, $\phi_k^u$ becomes '0' (zero) and a phase of '0' (zero) is applied to the original BPSK symbol. Since there is additional phase component other than the conventional BPSK constellation coordinates, the transmitting end according to this embodiment estimates $\phi_k^u$ as '0' (zero) and determines $C_k$ as '0' (zero) according to the value 0 (zero) of $\phi_k^u$. If the signals are received by the phase demapper in FIG. 19A, $C_k$ having a value '0' (zero) is outputted to the macro phase selector 1910 and the micro phase selector 1920 to remove the components of $\phi_k^u$ (='0' (zero)) and $\phi_k^m$ (='0' (zero)).

Moreover, when $\phi_k^m$ is determined as 'π' (pi) with respect to the specific sub-carrier group k in order for the transmitting end according to this embodiment to reduce the PAPR, $\phi_k^u$ becomes 'π/6' so that a phase of '7π/6' is applied to the original BPSK symbol. Since there is additional phase component as much as 'π/6' in comparison to the conventional BPSK constellation coordinates, the transmitting end according to this embodiment estimates $\phi_k^u$ as 'π/6' and Ck as '1' (one) according to the determination for $\phi_k^u$ as 'π/6'. If when the signals are received by the phase demapper in FIG. 19A, Ck having a value '1' (one) is outputted to the macro phase selector 1910 and the micro phase selector 1920 to remove the components of $\phi_k^u$ (='π/6') and $\phi_k^m$ (='π/6').

Figure 20:
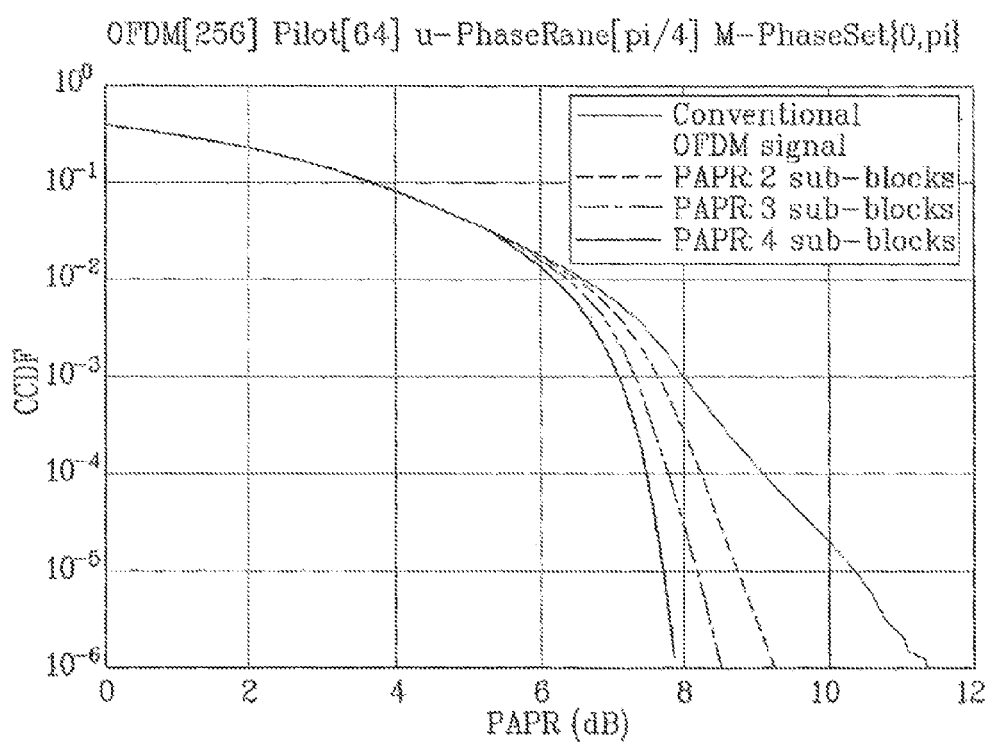
FIG. 20 is a view illustrating performance when a data transmitting and receiving method according to an embodiment of the present invention is used.

FIG. 20 is a view illustrating performance when the data transmitting and receiving method according to an embodiment of the present invention is used. FIG. 20 illustrates the performance to which the reduction of the PAPR is not applied. FIG. 20 also illustrates the performance to which the sub-carriers are grouped into 2, 3, and 4 sub-carrier groups to apply the PAPR code. FIG. 20 relates to a performance when a single OFDM symbol comprises 256 subcarrier. The PAPR performance is represented by complementary cumulative distribution function (CCDF) and FIG. 20 illustrates possibility in excess of a specific PAPR value.

Figure 21:
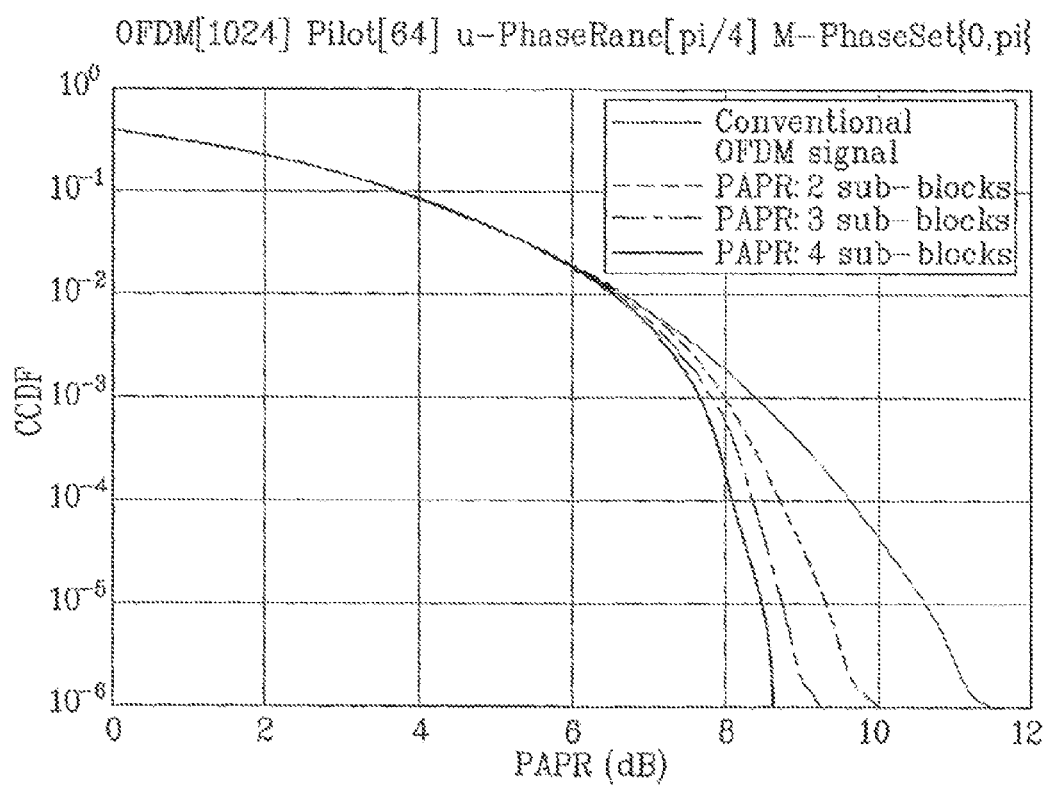
FIG. 21 is another view illustrating the performance when a data transmitting and receiving method according to an embodiment of the present invention is used.

FIG. 21 is another view illustrating the performance when a data transmitting and receiving method according to the embodiment of the present invention is used. FIG. 21 illustrates the performance to which the reduction of the PAPR is not applied. FIG. 21 also illustrates the performance to which the sub-carriers are grouped into 2, 3, and 4 sub-carrier groups to apply the PAPR code. FIG. 20 relates to a performance when a single OFDM symbol comprises 1024 subcarrier.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

According to the present invention, the following advantage can be obtained.

According to the present invention, since additional data channels other than the conventional data channels are generated, the effectiveness of the broadband of the conventional communication system can be increased.

What is claimed is:

1. A method of receiving signals at a receiver, the method comprising:
   receiving a time domain signal at the receiver from a transmitter,
   wherein:
      at least one first information bit is mapped, resulting in at least one first mapped symbol;
      at least one second information bit is mapped, resulting in at least one second mapped symbol;
      at least one third information bit is multiplied only to the at least one second mapped symbol among the at least one first mapped symbol and the at least one second mapped symbol; and
      the time domain signal is generated from the at least one first mapped symbol and the at least one second mapped symbol.

2. The method of claim 1, wherein the at least one second information bit and the at least one third information bit comprise pilot information and additional information other than user data.

3. The method of claim 1, wherein the mapping of the at least one first information bit and the mapping of the at least one second information bit comprise at least one of a binary phase shift keying (BPSK), a quadrature phase shift keying (QPSK), a M-ary phase shift keying (PSK) or a M-ary quadrature amplitude modulation (QAM).

4. The method of claim 1, wherein the time domain signal is generated from the at least one first mapped symbol, which is not multiplied by the at least one third information bit, and the at least one second mapped symbol which is multiplied by the at least one third information bit.

5. The method of claim 1, wherein the transmitter uses a single carrier frequency division multiple access (SC-FDMA) transmission scheme.

6. The method of claim 1, wherein the receiver is a base station, and the transmitter is a mobile terminal.

7. The method of claim 1, wherein:
the at least one third information bit is mapped, resulting in at least one third mapped symbol; and
the at least one third mapped symbol is multiplied to the at least one second mapped symbol.

8. An apparatus for receiving signals, the apparatus comprising:
a receiver configured to receive a time domain signal from a transmitter,
wherein:
at least one first information bit is mapped, resulting in at least one first mapped symbol;
at least one second information bit is mapped, resulting in at least one second mapped symbol;
at least one third information bit is multiplied only to the at least one second mapped symbol among the at least one first mapped symbol and the at least one second mapped symbol; and
the time domain signal is generated from the at least one first mapped symbol and the at least one second mapped symbol.

9. The apparatus of claim 8, wherein the at least one second information bit and the at least one third information bit comprise pilot information and additional information other than user data.

10. The apparatus of claim 8, wherein the mapping of the at least one first information bit and the mapping of the at least one second information bit comprise at least one of a binary phase shift keying (BPSK), a quadrature phase shift keying (QPSK), a M-ary phase shift keying (PSK) or a M-ary quadrature amplitude modulation (QAM).

11. The apparatus of claim 8, wherein the time domain signal is generated from the at least one first mapped symbol, which is not multiplied by the at least one third information bit, and the at least one second mapped symbol which is multiplied by the at least one third information bit.

12. The apparatus of claim 8, wherein the transmitter uses a single carrier frequency division multiple access (SC-FDMA) transmission scheme.

13. The apparatus of claim 8, wherein the receiver is a base station, and the transmitter is a mobile terminal.

14. The apparatus of claim 8, wherein:
the at least one third information bit is mapped, resulting in at least one third mapped symbol; and
the at least one third mapped symbol is multiplied to the at least one second mapped symbol.

\* \* \* \* \*